US011314326B2

(12) United States Patent
Yasuda et al.

(10) Patent No.: US 11,314,326 B2
(45) Date of Patent: Apr. 26, 2022

(54) INFORMATION PROCESSING DEVICE, INFORMATION PROCESSING METHOD, AND PROGRAM FOR DETERMINING A USER GAZE

(71) Applicant: SONY CORPORATION, Tokyo (JP)

(72) Inventors: Ryouhei Yasuda, Kanagawa (JP); Takuro Noda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/958,344

(22) PCT Filed: Nov. 8, 2018

(86) PCT No.: PCT/JP2018/041436
§ 371 (c)(1),
(2) Date: Jun. 26, 2020

(87) PCT Pub. No.: WO2019/135313
PCT Pub. Date: Jul. 11, 2019

(65) Prior Publication Data
US 2021/0064129 A1    Mar. 4, 2021

(30) Foreign Application Priority Data
Jan. 4, 2018    (JP) .............................. JP2018-000262

(51) Int. Cl.
*G06F 3/01*    (2006.01)
*G02B 27/00*    (2006.01)
*G02B 27/01*    (2006.01)

(52) U.S. Cl.
CPC ......... *G06F 3/013* (2013.01); *G02B 27/0093* (2013.01); *G02B 27/0172* (2013.01); *G06F 3/012* (2013.01)

(58) Field of Classification Search
CPC ............................ G06F 3/013; G02B 27/0093
See application file for complete search history.

(56) References Cited

U.S. PATENT DOCUMENTS 9,066,667 B1 *  6/2015  Berme ................. A61B 3/0033
9,277,857 B1 *  3/2016  Berme ................. A61B 3/0025
(Continued)

FOREIGN PATENT DOCUMENTS

JP    2000-348215 A    12/2000
JP    2006-154890 A     6/2006
(Continued)

*Primary Examiner* — Chun-Nan Lin
(74) *Attorney, Agent, or Firm* — Paratus Law Group, PLLC

(57) ABSTRACT

There is provided an information processing device, an information processing method, and a program are provided that enable displaying predetermined contents at the user-intended timing. The information processing device includes a viewpoint information obtaining unit that obtains viewpoint information related to the viewpoint of a user; a position-related information obtaining unit that obtains position-related information related to the position of the user and the position of a predetermined object; a head rotation information obtaining unit that obtains head rotation information related to the angular velocity accompanying the rotation of the head region of the user and related to the changes in the angular velocity; and a determining unit that, based on a gazing score which is calculated for each object according to the position-related information and the head rotation information and which indicates the extent of gazing of the user with respect to the object, determines whether or not the user is gazing at the object.

21 Claims, 21 Drawing Sheets

(56) References Cited

U.S. PATENT DOCUMENTS

| | | | |
|---|---|---|---|
| 9,517,008 B1* | 12/2016 | Berme | A61B 3/0058 |
| 10,313,481 B2* | 6/2019 | Kada | A63F 13/5372 |
| 10,438,418 B2* | 10/2019 | Iwai | A63F 13/35 |
| 10,496,158 B2* | 12/2019 | Terahata | G02B 27/0093 |
| 10,642,569 B2* | 5/2020 | Lin | G06F 3/04815 |
| 10,747,311 B2* | 8/2020 | Ura | H04R 3/005 |
| 10,754,420 B2* | 8/2020 | Yu | G06T 3/4038 |
| 10,769,797 B2* | 9/2020 | Budagavi | H04N 21/2353 |
| 10,890,968 B2* | 1/2021 | Kurlethimar | G02B 27/0093 |
| 2010/0201621 A1* | 8/2010 | Niikawa | G06F 3/013 |
| | | | 345/158 |
| 2012/0206452 A1* | 8/2012 | Geisner | H04S 7/304 |
| | | | 345/419 |
| 2015/0010206 A1* | 1/2015 | Sakamaki | G06K 9/00604 |
| | | | 382/103 |
| 2015/0301595 A1* | 10/2015 | Miki | G06F 3/04842 |
| | | | 715/847 |
| 2015/0363071 A1* | 12/2015 | Devale | G06F 3/012 |
| | | | 715/782 |
| 2016/0041391 A1* | 2/2016 | Van Curen | G02B 27/017 |
| | | | 345/633 |
| 2017/0053452 A1* | 2/2017 | Arai | G02B 27/0172 |
| 2017/0148339 A1* | 5/2017 | Van Curen | H04N 13/271 |
| 2017/0150230 A1* | 5/2017 | Shimura | G06F 3/04815 |
| 2018/0307303 A1* | 10/2018 | Powderly | G06F 1/163 |
| 2019/0079580 A1* | 3/2019 | Ura | H04R 1/406 |
| 2019/0320962 A1* | 10/2019 | Hill | A61B 5/163 |
| 2020/0233487 A1* | 7/2020 | Grzesiak | G06F 3/011 |

FOREIGN PATENT DOCUMENTS

| | | |
|---|---|---|
| JP | 2014-086063 A | 5/2014 |
| JP | 2016-035742 A | 3/2016 |
| JP | 2016-151798 A | 8/2016 |
| JP | 6236691 B1 | 11/2017 |
| WO | WO 2016/002445 A1 | 1/2016 |

* cited by examiner

LOW SCORE  HIGH SCORE

LOW SCORE  HIGH SCORE

LOW SCORE  HIGH SCORE

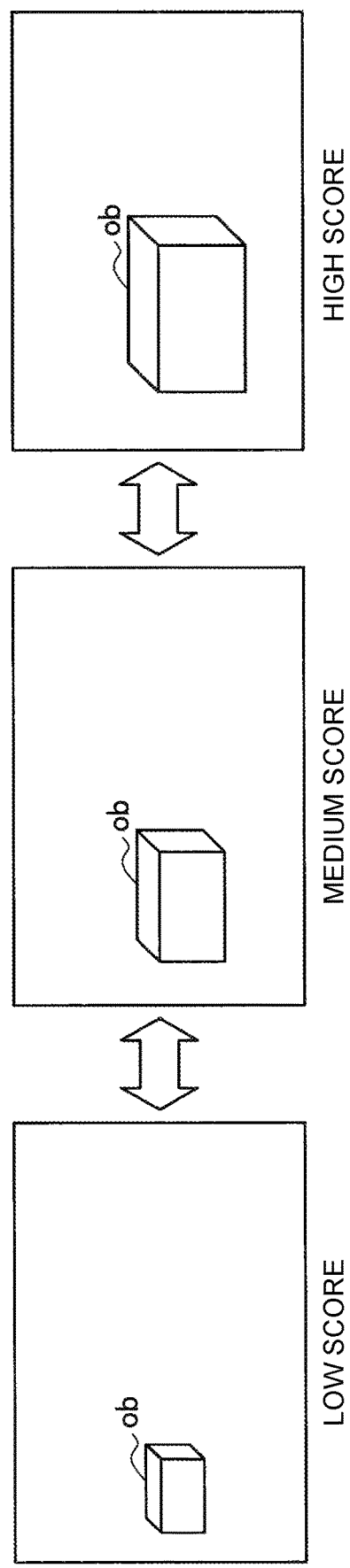

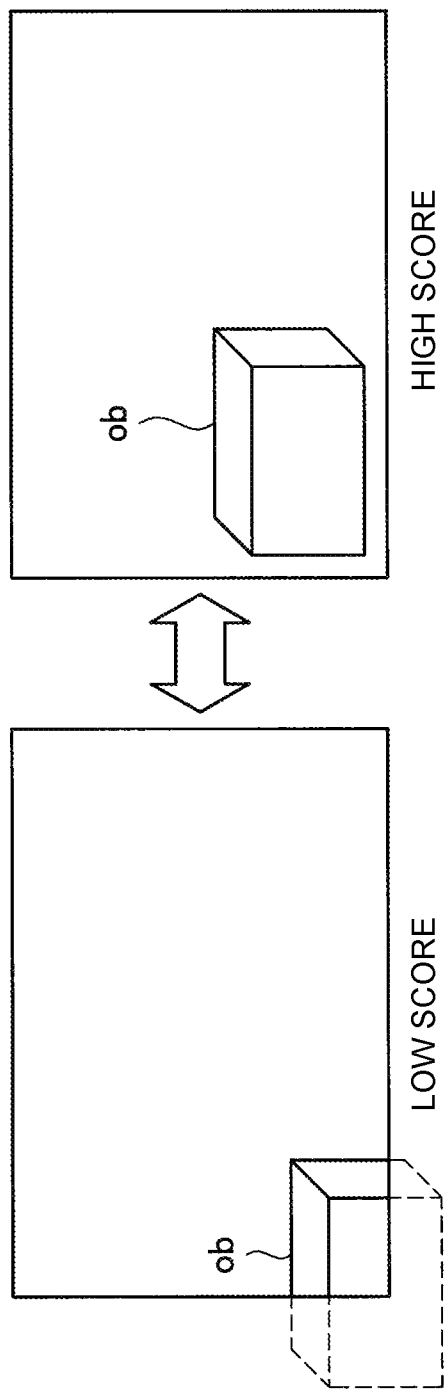

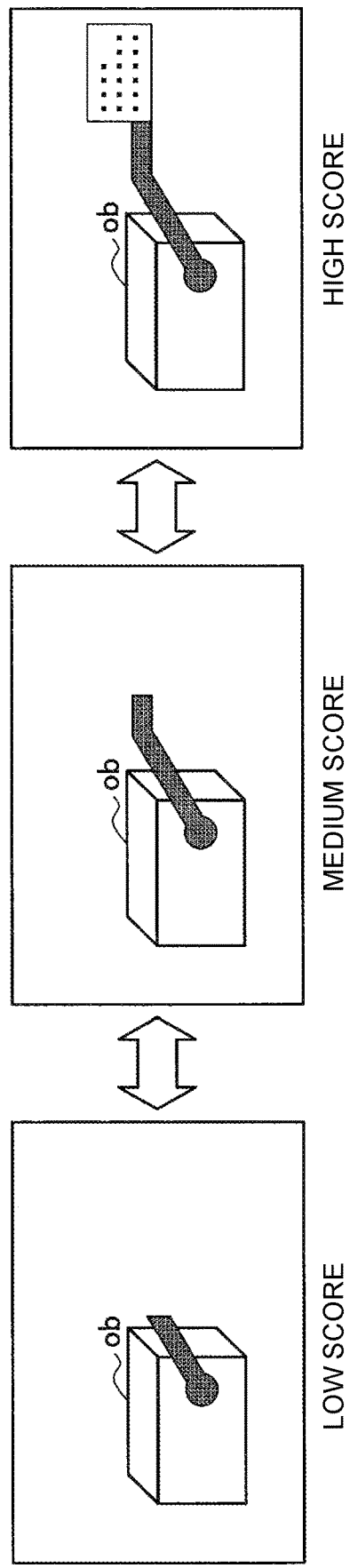

LOW SCORE ↔ HIGH SCORE

FIG.14

USER INFORMATION

| USER NAME | GENDER | AGE | HEIGHT | WEIGHT | HOBBY | SCHEDULE | ... |
|---|---|---|---|---|---|---|---|
| a | FEMALE | 45 | 157 | 50 | READING | 11/29 PARTY | ... |
| b | FEMALE | 27 | 163 | 53 | MUSIC APPRECIATION | | ... |
| c | MALE | 38 | 175 | 69 | MOUNTAIN CLIMBING | | ... |
| ... | ... | ... | ... | ... | ... | ... | ... |

FIG.15

OBJECT INFORMATION

| OBJECT | CATEGORY | PRIORITY | QUANTITY | PERIOD |
|---|---|---|---|---|
| a | BAG | HIGH | 30 | 12/01/2017~12/31/2017 |
| b | SHOES | LOW | 10 | 12/01/2017~12/31/2017 |
| c | BELT | MEDIUM | 20 | 12/01/2017~12/26/2017 |
| ... | ... | ... | ... | ... |

FIG.17

HISTORY INFORMATION

| OBJECT | DATE AND TIME | LOCATION | GAZING SCORE | CATEGORY | ... |
|---|---|---|---|---|---|
| a | 12/01/2017 10:53 | A | 40 | BAG | ... |
| b | 12/01/2017 10:56 | B | 21 | SHOES | ... |
| c | 12/01/2017 11:00 | C | 6 | BELT | ... |
| ... | ... | ... | ... | ... | ... |

INFORMATION PROCESSING DEVICE, INFORMATION PROCESSING METHOD, AND PROGRAM FOR DETERMINING A USER GAZE

CROSS REFERENCE TO PRIOR APPLICATION

This application is a National Stage Patent Application of PCT International Patent Application No. PCT/JP2018/041436 (filed on Nov. 8, 2018) under 35 U.S.C. § 371, which claims priority to Japanese Patent Application No. 2018-000262 (filed on Jan. 4, 2018), which are all hereby incorporated by reference in their entirety.

FIELD

The application concerned is related to an information processing device, an information processing method, and a program.

BACKGROUND

In the case of detecting the user viewpoint with respect to a target group of objects for selection, such as menu items in the virtual space or objects in the real space, and then selecting an object; generally a method is used in which the holding time of the point of gaze toward each object is used to determine whether or not the gazing state is attained for that object. In the method for selecting an object by using the holding time of the point of gaze, smaller the determination threshold value for the holding time of the point of gaze, the higher is the possibility that an object different than the user-intended object gets selected.

In that regard, in Patent Literature 1 mentioned below, an information processing device is disclosed that changes the display form of the UI (User Interface), which is displayed in a display unit, according to the detection accuracy of the gazing position calculated using face orientation information of the user, distance information, gazing period information, and resolution information.

CITATION LIST

Patent Literature

Patent Literature 1: JP 2016-151798 A

SUMMARY

Technical Problem

The information processing device disclosed in Patent Literature 1 changes the display form according to the detection accuracy. However, if sufficient detection accuracy is not achieved, only a few icons are displayed near the gazing position of the user. Hence, there is still room for improvement m displaying predetermined contents at the user-intended timing.

In that regard, in the application concerned, in view of the issues mentioned above, an information processing device, an information processing method, and a program are provided that enable displaying predetermined contents at the user-intended timing.

Solution to Problem

According to the present disclosure, an information processing device is provided that includes: a viewpoint information obtaining unit that obtains viewpoint information related to viewpoint of user; a position-related information obtaining unit that obtains position-related information related to position of the user and position of predetermined object; a head rotation information obtaining unit that obtains head rotation information related to angular velocity accompanying rotation of head region of the user and related to changes in the angular velocity; and a determining unit that, based on a gazing score which is calculated for each object according to the position-related information and the head rotation information and which indicates extent of gazing of the user with respect to the object, determines whether or not the user is gazing at the object.

Moreover, according to the present disclosure, an information processing method is provided that includes: obtaining viewpoint information related to viewpoint of user; obtaining position-related information related to position of the user and position of predetermined object; obtaining head rotation information related to angular velocity accompanying rotation of head region of the user and related to changes in the angular velocity; and determining, based on a gazing score which is calculated for each object according to the position-related information and the head rotation information and which indicates extent of gazing of the user with respect to the object, whether or not the user is gazing at the object.

Moreover, according to the present disclosure, a program is provided that causes a computer to function as: a viewpoint information obtaining unit that obtains viewpoint information related to viewpoint of user; a position-related information obtaining unit that obtains position-related information related to position of the user and position of predetermined object; a head rotation information obtaining unit that obtains head rotation information related to angular velocity accompanying rotation of head region of the user and related to changes in the angular velocity; and a determining unit that, based on a gazing score which is calculated for each object according to the position-related information and the head rotation information and which indicates extent of gazing of the user with respect to the object, determines whether or not the user is gazing at the object.

According to the application concerned, a gazing score for each object is determined according to viewpoint information of the user, position-related information regarding the position of the user and the position of the object, and head rotation information regarding the rotation of the head region of the user.

Advantageous Effects of Invention

As described above, according to the application concerned, it becomes possible to display predetermined contents at the user-intended timing.

The abovementioned effect is not necessarily limited in scope and, in place of or in addition to the abovementioned effect, any other effect indicated in the present written description or any other effect that may occur from the present written description can also be achieved.

BRIEF DESCRIPTION OF DRAWINGS

FIG. 6D is an explanatory diagram for explaining an example of the display form of the object ob according to the concerned embodiment.

FIG. 6E is an explanatory diagram for explaining an example of the display form of the object ob according to the concerned embodiment.

FIG. 10A is an explanatory diagram for explaining an example of the display form of the object ob according to the concerned embodiment.

FIG. is an explanatory diagram for explaining an example of user information according to the concerned embodiment.

FIG. 15 is an explanatory diagram for explaining an example of the object information according to the concerned embodiment.

Figure 16:
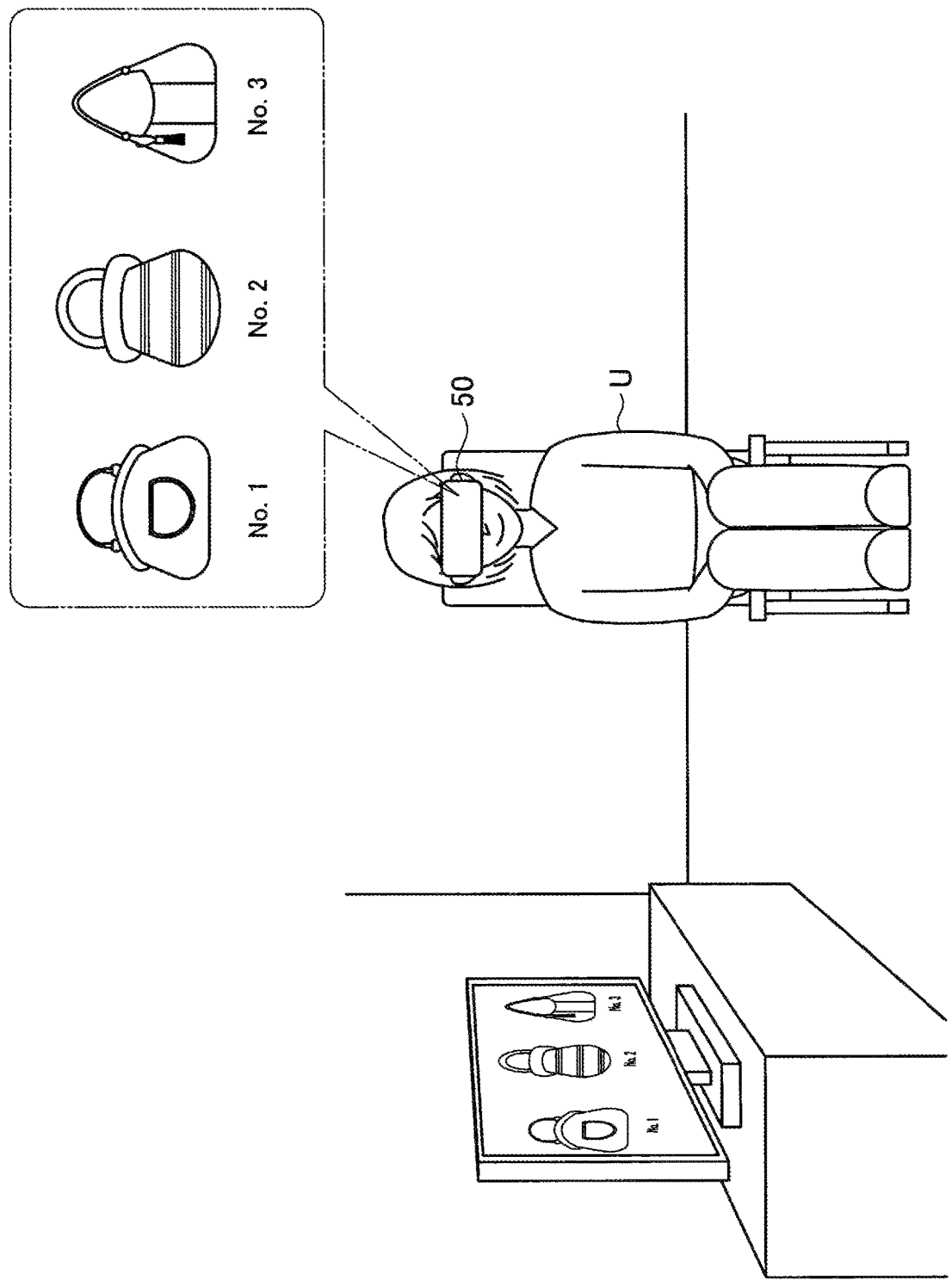

FIG. 16 is an explanatory diagram for explaining an example of the operations according to the concerned embodiment.

FIG. 17 is an explanatory diagram for explaining an example of gazing score history information according to the concerned embodiment.

Figure 18:
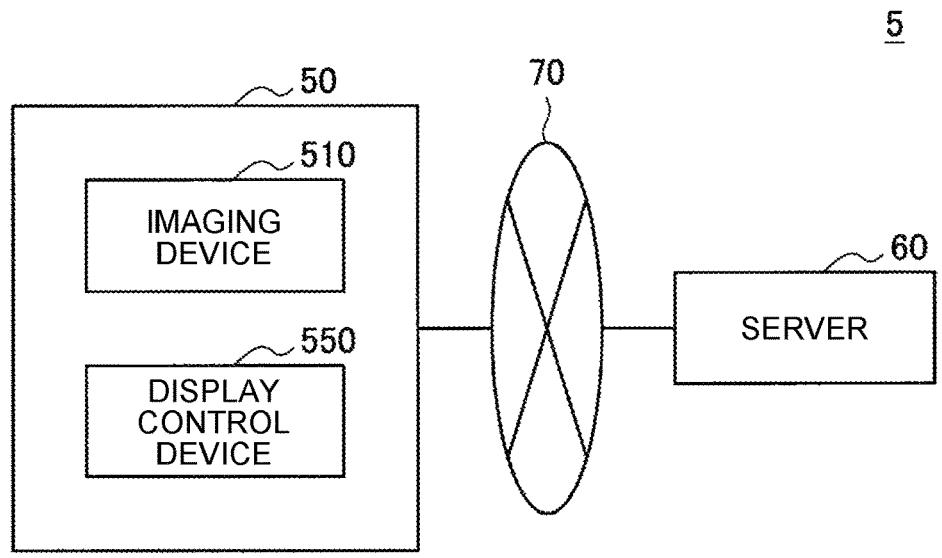

FIG. 18 is a block diagram illustrating a configuration of an information processing system 5 according to another embodiment of the application concerned.

Figure 19:
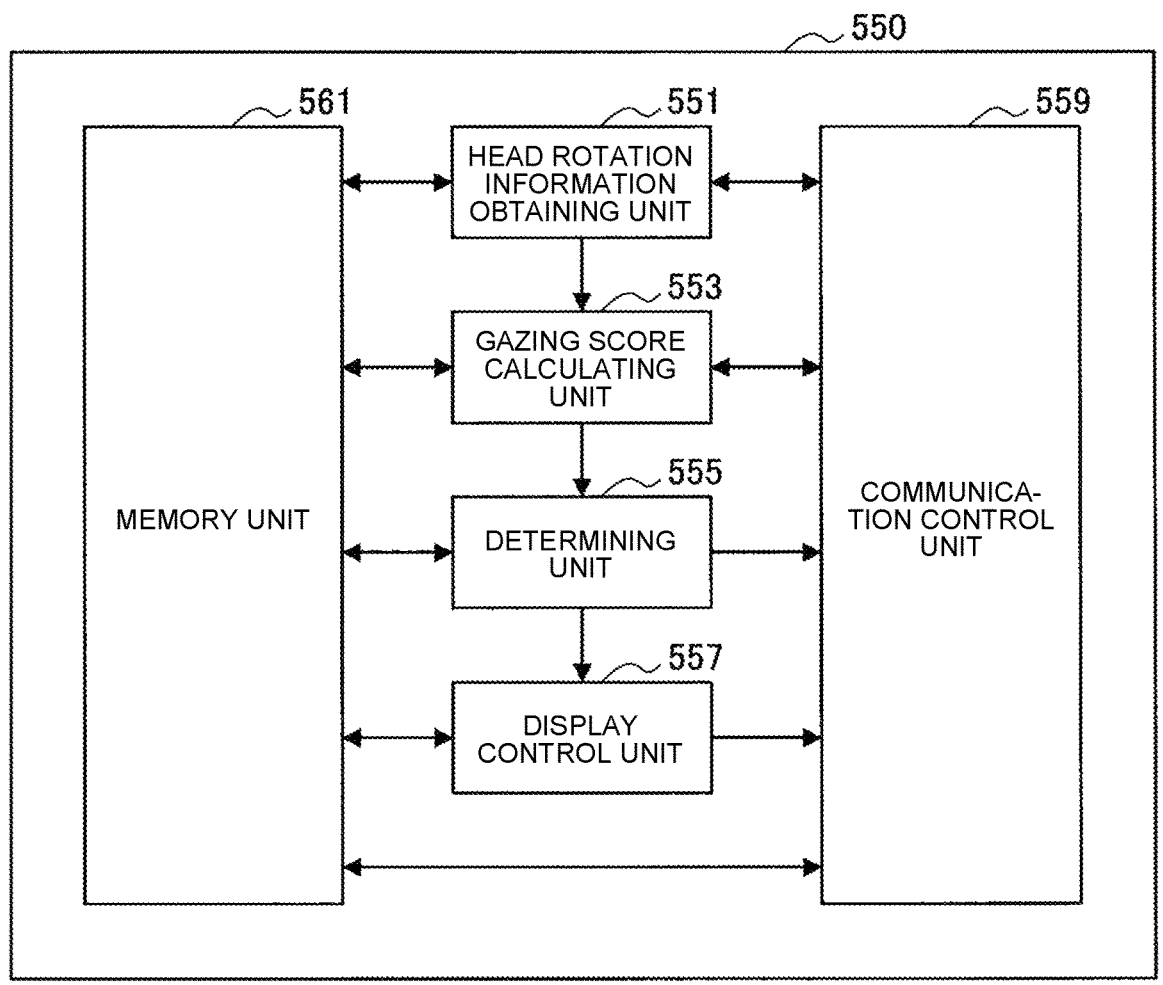

FIG. 19 is a block diagram illustrating an exemplary configuration of a display control device 550 according to the other embodiment.

Figure 20:
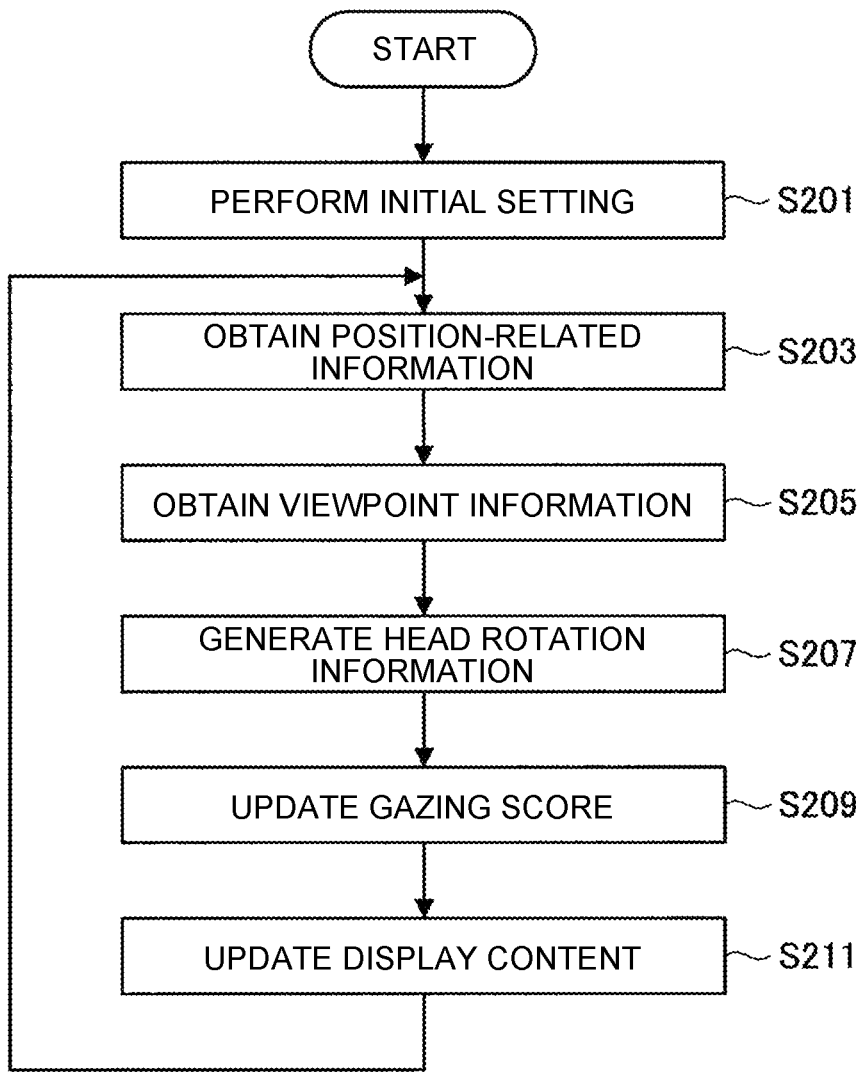

FIG. 20 is a flowchart for explaining an example of the flow of operations performed according to the other embodiment.

Figure 21:
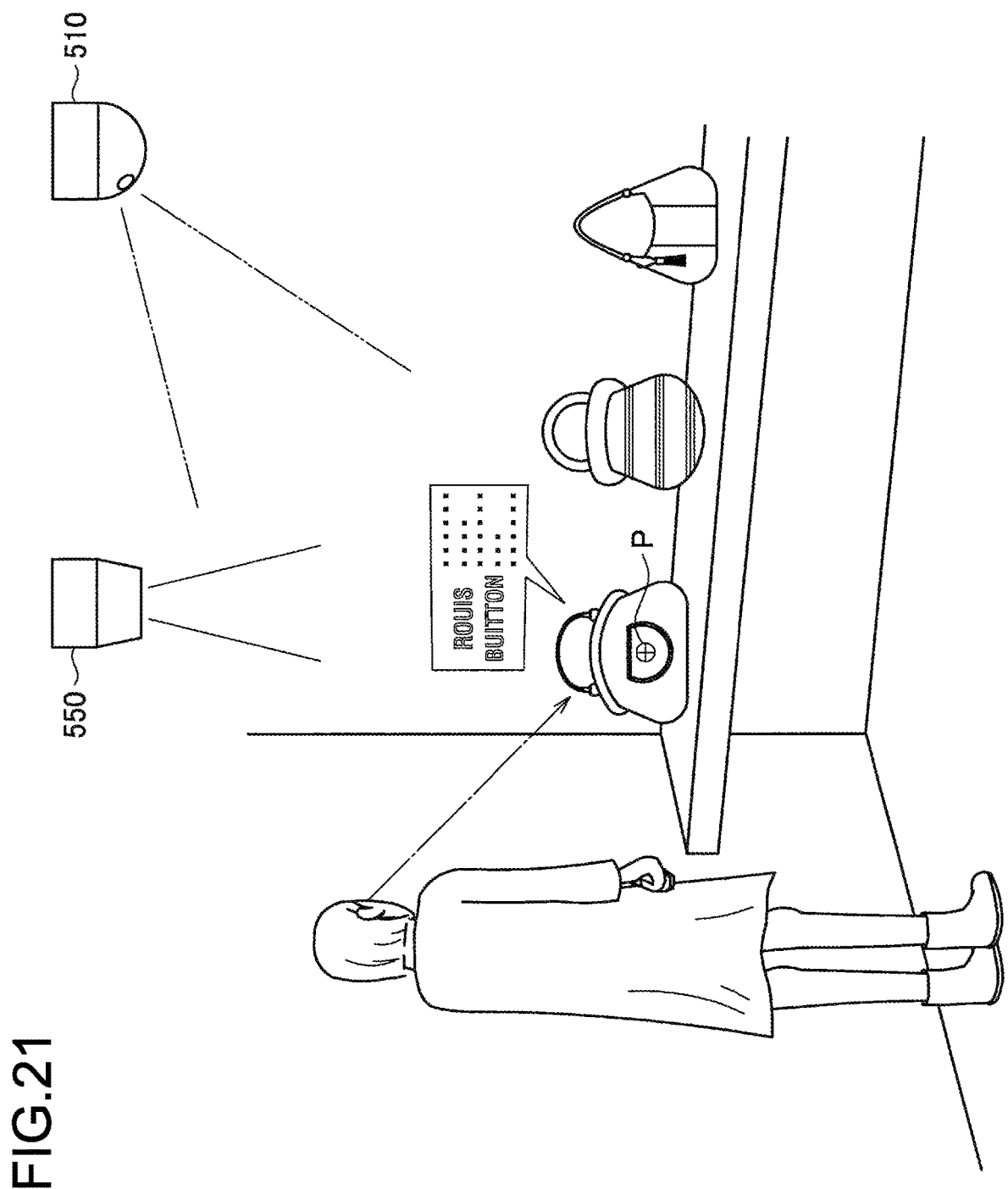

FIG. 21 is an explanatory diagram for explaining an example of the operations according to the other embodiment.

Figure 22:
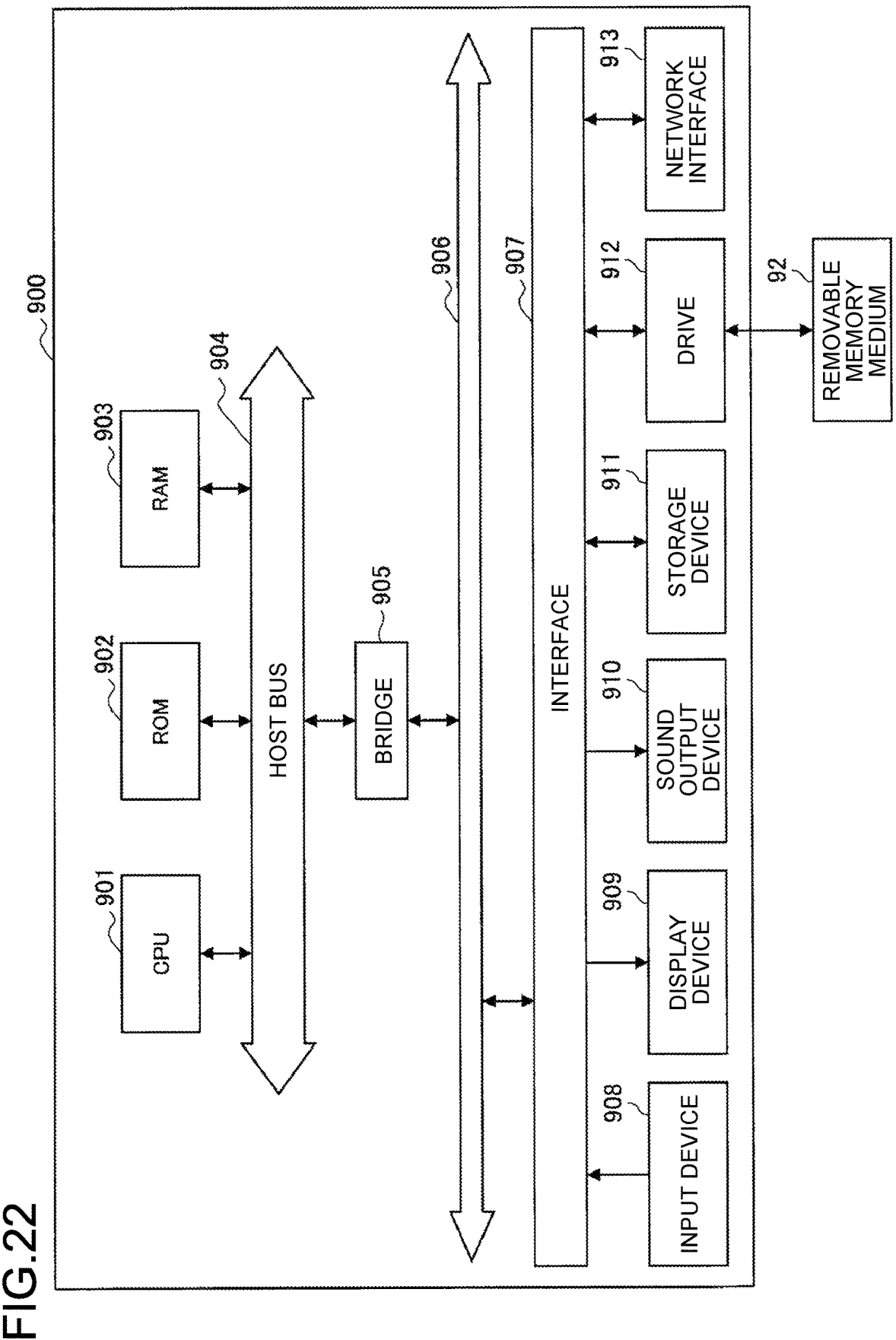

FIG. 22 is a block diagram illustrating a hardware configuration of the information processing device 10 according to the embodiments of the application concerned.

DESCRIPTION OF EMBODIMENTS

Preferred embodiments of the application concerned are described below in detail with reference to the accompanying drawings. In the present written description and the drawings, the constituent elements having practically identical functional configuration are referred to by the same reference numerals, and the explanation is not given repeatedly.

Moreover, in the present written description and the drawings, a plurality of constituent elements having practically identical functional configuration are sometimes distinguished by attaching different alphabets after the same reference numerals. However, when a plurality constituent elements having practically identical functional configuration need not be particularly distinguished from each other, only the same reference numerals are used.

The explanation is given in the following sequence.
<<<First embodiment>>>
<<<Configuration>>
<Overall configuration>
<Configuration of information processing device 10>
<<Operations>>
<<Operation example 1>>
<<Operation example 2>>
<<Operation example 3>>
<<Operation example 4>>
<<Operation example 5>>
<<Operation example 6>>
<<Operation example 7>>
<<<Second embodiment>>>
<<Configuration>>
<<Operation>>
<<<Hardware configuration>>>
<<<Summary>>>

First Embodiment

<<Configuration>>

Figure 1:
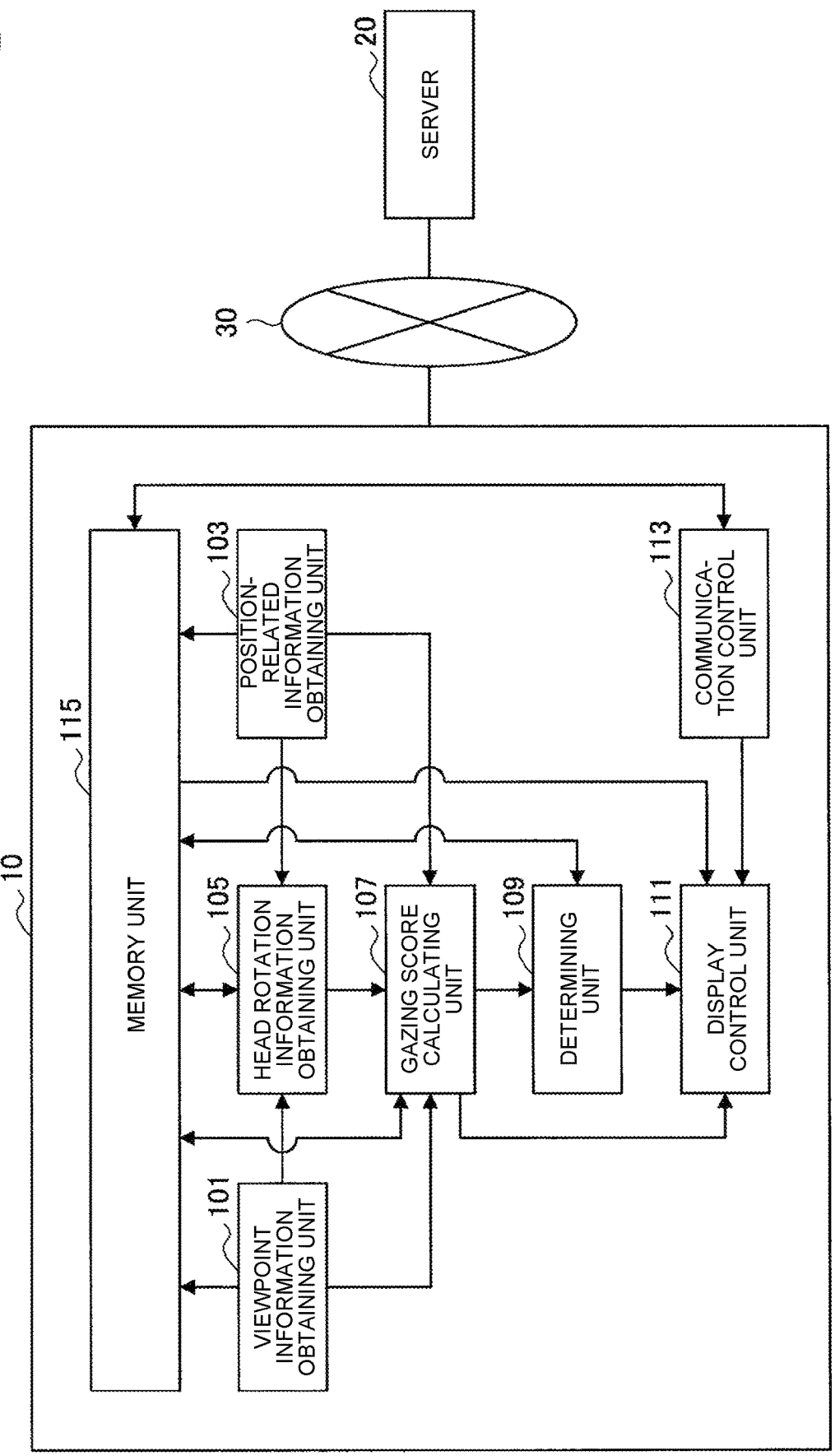
FIG. 1 is a block diagram illustrating a configuration example of an information processing system 1 according to an embodiment of the application concerned.
Figure 2:
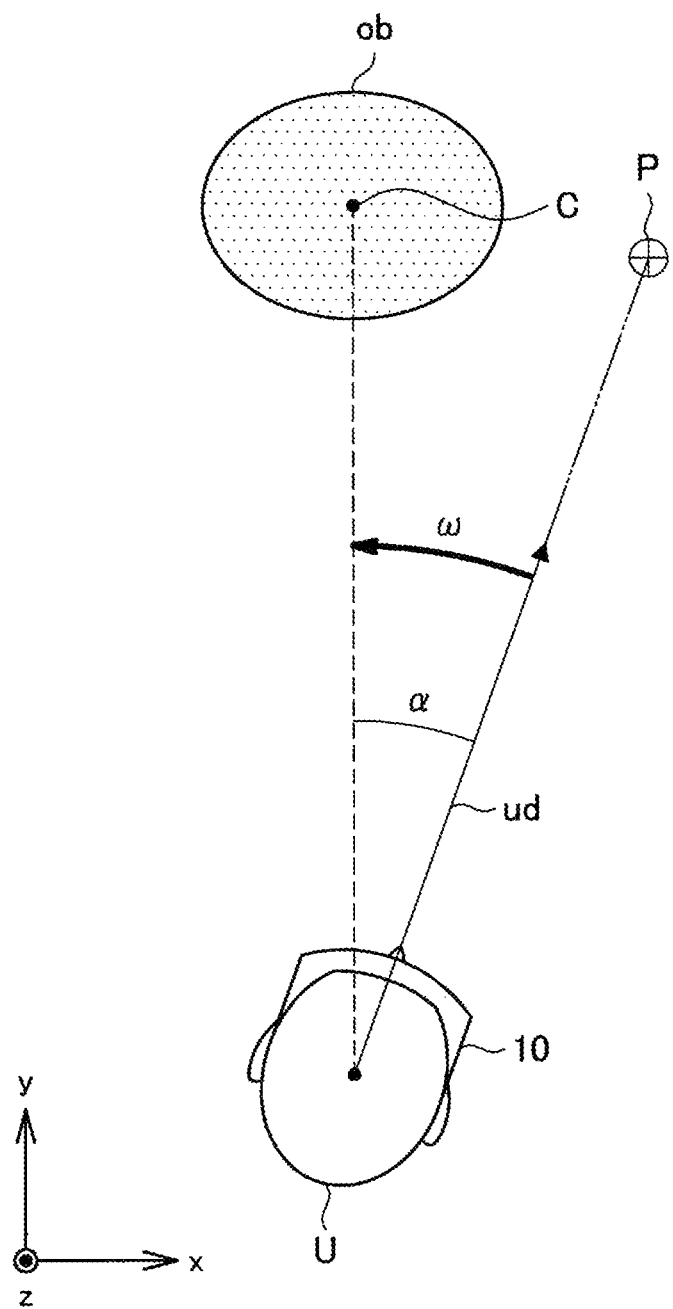
FIG. 2 is an explanatory diagram for explaining the overview of head rotation information according to the concerned embodiment.
Figure 3:
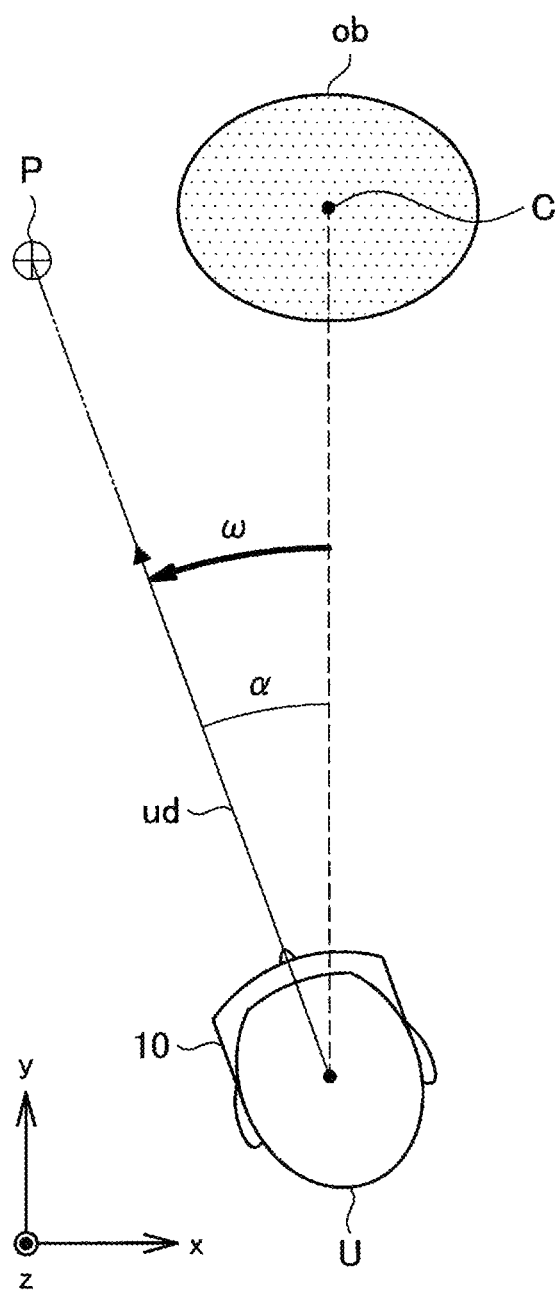
FIG. 3 is an explanatory diagram for explaining the overview of head rotation information according to the concerned embodiment.

Firstly, explained below with reference to FIG. 1, FIG. 2, and FIG. 3 is an overall configuration of an information processing system 1 according to a first embodiment of the application concerned. FIG. 1 is a block diagram illustrating a configuration example of the information processing system 1 according to the first embodiment of the application concerned. FIG. 2 is an explanatory diagram for explaining the overview of head rotation information according to the first embodiment. FIG. 3 is an explanatory diagram for explaining the overview of head rotation information according to the first embodiment.

<Overall Configuration>

As illustrated in FIG. 1, the information processing system 1 according to the first embodiment includes at least an information processing device 10. The information processing device 10 is capable of performing communication with one or more types of servers 20, as may be necessary, via a known network 30 such as the Internet.

The information processing device 10 according to the first embodiment can be a wearable device for a user U, such as an eyeglasses-type display or a head mount display (HMD); or can be an information processing terminal such as a smartphone. The information processing device 10 obtains viewpoint information related to a viewpoint P of the user U, and obtains position-related information about the position of the user U and the position of an object ob. Moreover, based on the obtained viewpoint information and the obtained position-related information, the information processing device 10 obtains head rotation information that is related to the angular velocity and the changes in the angular velocity accompanying the rotation of the head region of the user U. The information processing device has the function of calculating a gazing score S, which indicates the extent of gazing at the object ob by the user U, according to the viewpoint information, the position-related information, and the head rotation information; and then determining whether or not the user U is gazing at the object ob.

In each server 20, object information is stored that represents a variety of information related to various objects ob present in the environment in which the user U is also present. Moreover, the server 20 can also manage user information of the user U of the information processing device 10. The information processing device 10 can perform mutual communication with the appropriate server 20 as may be necessary, and can obtain information from that server 20.

The network 30 is implemented using a known information communication technology such as the Internet, and connects the information processing device 10 to the servers 20.

The object information contains at least either information related to the actual object ob or information with respect to the object ob that is set for use. The information related to the actual object ob can also contain, for example, the name of the object ob. Moreover, for example, when the object ob is a product, the information set with respect to the object ob can contain information such as the quantity of inventory, the sale priority, and the sale period.

Furthermore, the object information can be registered in advance by the administrator of the object ob. For example, when the object ob is an object, the object information can be registered in advance by the manufacturer or the distribution firm of the object ob.

The user information represents information characterizing the individual user U, such as the external appearance or the preferences of the user U. Such information can contain, for example, information such as the gender, the height, and the hobbies of the user U as well as information such as the schedule of the user U. The user information can be registered by the user U of the information processing device 10, or can by automatically stored as a result of performing machine learning of the behavior of the user U by the server 20.

<Configuration of Information Processing Device 10>

Given below is the detailed explanation of a configuration of the information processing device 10 according to the first embodiment. For example, the information processing device 10 according to the first embodiment includes a viewpoint information obtaining unit 101, a position-related information obtaining unit 103, a head rotation information obtaining unit 105, a gazing score calculating unit 107, a determining unit 109, a display control unit 111, a communication control unit 113, and a memory unit 115.

The viewpoint information obtaining unit 101 obtains viewpoint information related to the viewpoint P of the user U of the information processing device 10 based on image information obtained from an imaging device such as a visible light camera or an infrared camera that is installed in the information processing device 10.

In the information processing device 10, a three-dimensional rectangular coordinate system is set in advance as the coordinate system for the information processing device 10 (hereinafter, the coordinate system for the information processing device 10 is simply referred to as a "device coordinate system"). For example, the viewpoint information obtaining unit 101 can obtain the positions of the eyes and the eye gaze direction of the user U in the device coordinate system using a known viewpoint detection technology, and can treat the obtained information as the viewpoint information by converting the device coordinate system into the global coordinate system representing the fixed coordinate system set in the space. The obtained viewpoint information is sent to at least either the head rotation information obtaining unit 105 or the gazing score calculating unit 107. Moreover, the obtained viewpoint information can be sent to the memory unit 115 as may be necessary, and can be stored as history information.

The position-related information obtaining unit 103 obtains the position-related information that is related to the position of the user U. The position-related information contains a variety of information related to the position of the user U. Examples of such information include the distance between the user U and the object ob and the movement speed of the user U with respect to the object ob (i.e., the temporal changes in the distance between the user U and the object ob).

The position-related information obtaining unit 103 is implemented using, for example, the camera installed in the information processing device 10; and the position and the orientation of the device coordinate system, when viewed from the global coordinate system set in the space in which the information processing device 10 is installed, can be obtained using a known technology such as the SLAM (Simultaneous Localization and Mapping). The obtained position and the obtained orientation of the device coordinate system are used as the position and the orientation of the user U. Then, the obtained position-related information is sent to at least either the head rotation information obtaining unit 105 or the gazing score calculating unit 107. Moreover, the obtained position-related information can be sent to the memory unit 115 as may be necessary, and can be stored as history information.

[Head Rotation Information Obtaining Unit 105]

The head rotation information obtaining unit 105 obtains head rotation information related to the angular velocity accompanying the rotation of the head region of the user U and the changes occurring in the angular velocity.

Herein, for example, the head rotation information obtaining unit 105 can obtain the direction of the device coordinate system, as obtained by the position-related information obtaining unit 103, as the direction of the head region. Moreover, the head rotation information obtaining unit 105 can obtain the rotation direction of the head region of the user U by detecting the temporal changes in the direction of the head region. More specifically, the head rotation information is obtained based on the straight line joining the head rotation center that can be treated as the position of the user U and an object center C, and based on a head direction ud of the user U obtained by the position-related information obtaining unit 103.

FIG. 2 is a diagram that schematically illustrates a case in which the user U attempts to gaze at a predetermined object ob.

The head rotation center of the user U and the center of the object ob are obtained by the position-related information obtaining unit 103 using a known position obtaining technology. The rotation direction of the head region of the user U is obtained by the head rotation information obtaining unit 105 by detecting the temporal changes in the head direction ud of the user U with respect to the position of the user U, that is, with respect to the straight line joining the head rotation center and the object center C.

Moreover, the head rotation information obtaining unit 105 detects an angle $\alpha_{t1}$ at a timing $t_1$ and detects an angle $\alpha_{t2}$ at a timing $t_2$ different than the timing $t_1$; and calculates an angular velocity $\omega$ by dividing the difference $\alpha_{t2}-\alpha_{t1}$ between the angles $\alpha_{t2}$ and $\alpha_{t2}$ by $t_2-t_1$.

The head rotation information obtained by the head rotation information obtaining unit 105 is sent to the gazing score calculating unit 107. Moreover, the obtained head rotation information can be sent to the memory unit 115 as may be necessary, and can be stored as history information.

Meanwhile, the position-related information obtaining unit 103 and the head rotation information obtaining unit 105 can be configured using a sensor such as an acceleration sensor or a gyro sensor meant for obtaining position information; and the position-related information and the head rotation information about the user U can be obtained using the output from the sensor.

[Gazing Score Calculating Unit 107]

The gazing score calculating unit 107 calculates, for each object ob, the gazing score S, which indicates the extent of gazing at the object ob by the user U, according to at least the viewpoint information obtained by the viewpoint information obtaining unit 101, the position-related information obtained by the position-related information obtaining unit 103, and the head rotation information obtained by the head rotation information obtaining unit 105. The calculated gazing score S is sent to at least either the determining unit 109 or the display control unit 111.

Given below is the explanation of an overview of the calculation method for calculating the gazing score. As described above, the gazing score S is calculated using the rotation direction of the head region of the user U and angular velocity $\omega$ accompanying that rotation.

In addition to using the rotation direction of the head region of the user U and the angular velocity $\omega$ accompanying the rotation, the calculation of the gazing score S can be set also based on all types of information handled by the information processing device 10 according to the first embodiment. For example, the calculation score S can be calculated according to the following: the distance between the user U and the object ob representing one part of the position-related information; the distance d from the object center C to the viewpoint P as calculated based on the viewpoint information and the position-related information; and the user information containing information about the characteristics of the user U and information that characterizes the preferences of the user U.

When the user U attempts to gaze at a predetermined object ob, he or she rotates the head region toward the central direction of that object ob with the aim of matching the direction of the head region with the direction toward the object ob. Subsequently, when the direction of the head region of the user U moves closer to the direction toward the object ob, the user U slows down the rotating speed of the head region. That is, when the user U attempts to gaze at a predetermined object ob, an angle $\alpha$, which represents the difference between the straight line joining the object center C to the user U and the head direction ud as illustrated in FIG. 2, goes on decreasing; and, as the angle $\alpha_1$ becomes smaller, the user U reduces the angular velocity $\omega$ accompanying the rotation of the head region.

When the user U does not gaze at the object ob, as illustrated in FIG. 3, even if the head region is rotated toward the direction of the object ob, he or she rotates the head region without reducing the angular velocity $\omega$ in the vicinity of the portion in which the head direction ud of the user U matches with the object center C. Then, the user U keeps on rotating the head region in such a way that the angle $\alpha$ increases.

Moreover, from the state of gazing at a predetermined object ob, when the user changes the gazing target to another object ob, he or she rotates the head region so as to match the direction of the head direction with the direction of that other object ob. At that time, the head region of the user u rotates in such a way that the angular velocity $\omega$ increases.

Thus, as a result of focusing on the rotation direction of the head region and the angular velocity $\omega$ with respect to the object ob, it becomes possible to accurately and promptly calculate the gazing score S in which the intention of the user U is reflected. That is, as a result of setting the calculation formula for calculating the gazing score S to reflect the rotation direction of the head region and the angular velocity $\omega$, the gazing score S can be calculated in an accurate and prompt manner.

Moreover, the gazing score calculating unit 107 can calculate the gazing score S according to the position of the viewpoint of the user U.

For example, in the case in which the viewpoint P of the user U is set on the object ob and in which the rotation direction of the head region of the user U with respect to the object ob is toward a decrease in the angle $\alpha$ formed by the straight line joining the head rotation center and the object center C with the direction of the head region of the user U as obtained by the position-related information obtaining unit 103; the gazing score calculating unit 107 can increase the gazing score S.

Alternatively, even when the viewpoint P of the user U is set on the object ob and when the rotation direction of the head region of the user U with respect to the object ob is toward an increase in the angle $\alpha$, as long as the angular velocity $\omega$ accompanying the rotation of the head region of the user U is equal to or smaller than a threshold value $\omega_{th}$, the gazing score calculating unit 107 can increase the gazing score S.

The gazing score calculation formula can be varied for each timing of calculating the gazing score S. While the user U is moving the viewpoint P and rotating the head region with the aim of gazing at an object ob; the viewpoint information, the position-related information, and the head rotation information changes according to the timing of calculating the gazing score S. Hence, for example, for each timing of calculating the gazing score S, the gazing score calculating unit 107 can vary the gazing score calculation formula according to the distance between the object on and the user U, the distance d from the object center C to the viewpoint P of the user U, and the angle $\alpha$ formed by the straight line joining the head rotation center and the object center C with the direction in which the user U is facing.

For example, when the user U attempts to gaze at a predetermined object ob, if the angle $\alpha$ is small, a calculation formula can be used that increases the gazing score S as compared to the case in which the angle $\alpha$ is large. Moreover, when the angle α is small and the angular velocity ω too is low, a calculation formula can be used that further increases the gazing score S.

Furthermore, for example, when the viewpoint P of the user U is not set on the object ob, a gazing score calculation formula can be used that reduces the gazing score S. As a result, regarding the objects ob that were already excluded from the gazing targets for the user U, it becomes possible to hold down the selection of the objects ob not intended by the user U.

The gazing score calculating unit 107 can calculate a gazing score addition amount according to the viewpoint information, the position-related information, and the head rotation information that is obtained; add the gazing score addition amount to the gazing score S obtained immediately before; and again calculate the gazing score S.

More particularly, the gazing score calculating unit 107 can calculate the gazing score addition amount according to the gazing score S calculated at the timing $t_1$ and according to the head rotation information obtained at the timing $t_2$ that is different than the timing $t_1$.

Moreover, the initial value of the gazing score S and the gazing score addition amount can vary for each timing of calculating the gazing score S. For example, the gazing score calculating unit 107 can vary the initial value of the gazing score S and the gazing score addition amount according to the distance between the object ob and the user U, the distance from the object center C to the viewpoint P of the user U, and the angle α formed by the straight line joining the head rotation center and the object center C with the direction in which the user U is facing.

More particularly, if $S_t$ represents the gazing score S at a timing $t$ and if A represents the gazing score addition amount, then the gazing score S can be calculated according to an equation given below. Herein, $f(S_t)$ can be treated as an arbitrary function having the score $S_t$ as the variable. Although there is no restriction on the specific function form, it is possible to use a polynomial function such as a linear function or a quadratic function, or it is possible to use an exponent function or a logarithmic function.

$$S_{t2}=f(S_{t1})+A \tag{1}$$

The gazing score addition amount A can be a fixed value or can be varied according to the head rotation information. In addition to varying it according to the head rotation information, the gazing score addition amount can be dynamically varied according to the user information such as the distance between the user U and the object ob representing one part of the position-related information, or the distance d from the object center C to the viewpoint P of the user U as calculated based on the viewpoint information and the position-related information, or the characteristics of the user U and information characterizing the preferences of the user U.

For example, in the case of making the gazing score addition amount A inversely proportional to the angular velocity ω representing the head rotation information, the gazing score addition amount A can be obtained using an angular velocity $ω_t$ at the timing t and an adjustment coefficient c as given below in an equation. The adjustment coefficient c can be set as a value that varies according to the distance between the user U and the object ob, or the distance d from the object center C to the viewpoint P of the user U, or the characteristics of the user U and the user information.

$$A=c/ω_t \tag{2}$$

Herein, $ω_t \neq 0$ holds true.

Meanwhile, the calculated gazing score S can be sent to the memory unit 115, and can be stored as history information.

[Determining Unit 109]

Based on the gazing score S calculated by the gazing score calculating unit 107, the determining unit 109 determines, for each object ob, whether or not the user U is gazing at the object ob. More particularly, it is desirable that, when the gazing score S of an object ob is equal to or greater than a predetermined determination threshold value, the determining unit 109 determines that the gazing state is attained in which the user U is gazing at the object ob. The determination result is sent at least to the display control unit 111, and can also be sent to the memory unit 115 as may be necessary and stored as history information.

Figure 4:
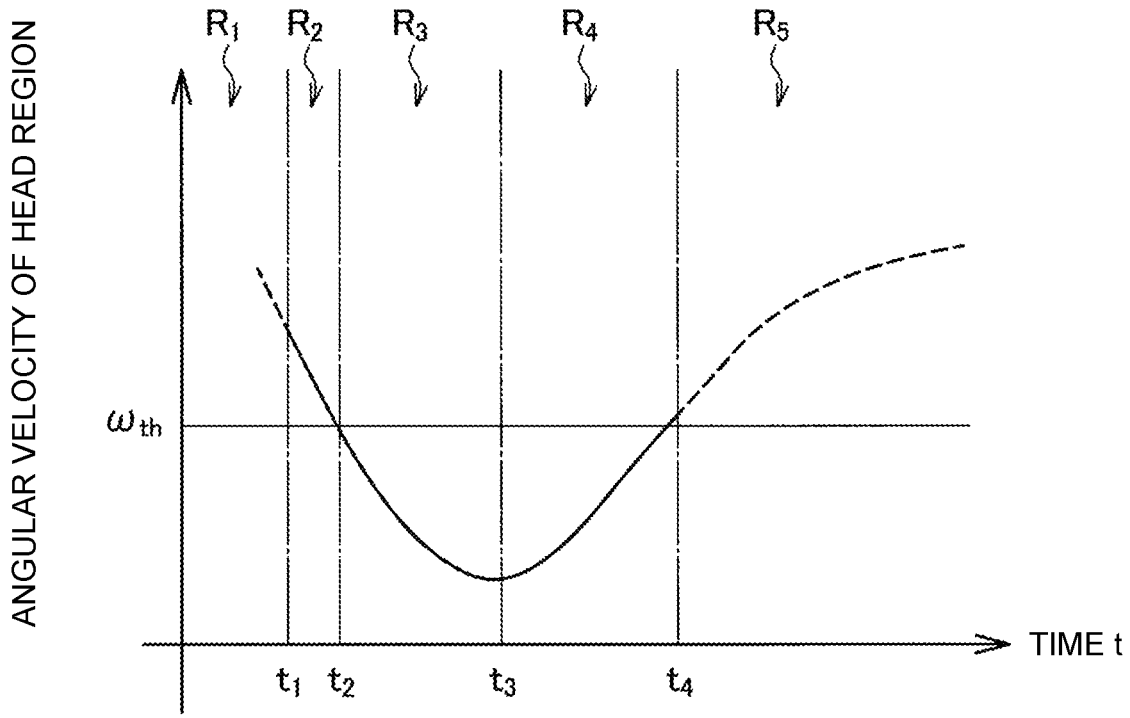
FIG. 4 is an explanatory diagram for explaining the overview of head rotation information according to the concerned embodiment.
Figure 5:
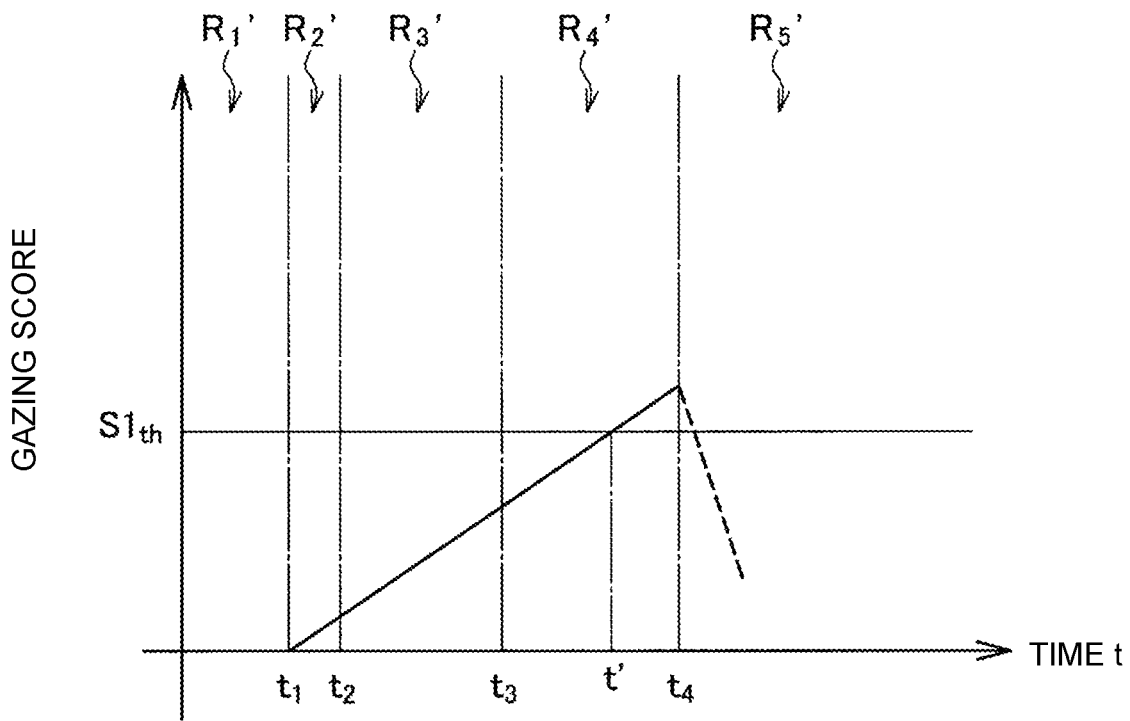
FIG. 5 is an explanatory diagram for explaining the overview of head rotation information according to the concerned embodiment.

Explained below with reference to FIGS. 4 and 5 is the manner in which changes occur in the gazing score S calculated by the gazing score calculating unit 107 and the gazing determination performed by the determining unit 109. FIG. 4 is a graph illustrating an example of the angular velocity ω of the user at each timing t. FIG. 5 is a graph illustrating the relationship between each timing t and the gazing score S calculated by the gazing score calculating unit 107. Herein, areas R1 to R5 illustrated in FIG. 4 correspond to areas R1' to R5', respectively, illustrated in FIG. 5. Moreover, $S1_{th}$ illustrated in FIG. 5 represents the determination threshold value set in advance. When the gazing score S becomes equal to or greater than the determination threshold value $S1_{th}$, the determining unit 109 determines that the gazing state is attained in which the user U is gazing at the object ob.

Explained below with reference to an example is the case of calculating the gazing score addition amount when the viewpoint P of the user U is on the target object ob. The gazing score S has the initial value of zero. When the viewpoint P of the user U is not on the target object ob for gazing (hereinafter, simply referred to as the "gazing target object ob"), the gazing score addition amount is set to have a negative value; and when the gazing score S is equal to zero, the gazing score addition amount is set to zero. Moreover, the gazing determination method is explained under the assumption that the calculated gazing score addition amount is constant.

As illustrated in FIG. 4, the plane defined by the timing t and the angular velocity ω can be divided into areas $R_1$ to $R_5$. The area $R_1$ is an area indicating the state in which angle α, which is formed by the straight line joining the head rotation center and the object rotation center C with the head direction ud of the user U as obtained by the position-related information obtaining unit 103, rotates in the direction of decrease, and the angular velocity ω accompanying the rotation of the head is equal to or greater than the predetermined threshold value $ω_{th}$; but the viewpoint P of the user U is not on the gazing target object ob. The area $R_2$ is an area indicating the state in which the viewpoint P of the user U is on the target object ob for gazing, the angle α rotates in the direction of decrease, and the angular velocity ω is equal to or greater than the predetermined threshold value $ω_{th}$. The area $R_3$ is an area indicating the state in which the viewpoint P of the user U is on the target object ob for gazing, the angle α rotates in the direction of decrease, and the angular velocity ω is smaller than the predetermined threshold value $ω_{th}$. The area $R_4$ is an area indicating the state in which the viewpoint P of the user U is on the target object ob for gazing, the angle α rotates in the direction of increase, and the angular velocity ω is smaller than the predetermined threshold value $\omega_{th}$. The area $R_5$ is an area indicating the state in which the viewpoint P of the user U is not on the target object ob for gazing, the angle α rotates in the direction of increase, and the angular velocity ω is equal to or greater than the predetermined threshold value $\omega_{th}$.

In the area $R_1$, since the viewpoint P of the user U is not on the target object ob, as illustrated in FIG. 5, in an area $R_1'$ corresponding to the area $R_1$, the gazing score addition amount is equal to zero and the gazing score S is constant at zero.

In the area $R_2$, although the viewpoint P of the user U is on the target object ob for gazing and the angular velocity ω is equal to or greater than the predetermined threshold value $\omega_{th}$, the head region of the user U is rotating in the direction of decrease in the angle α. Hence, as illustrated in an area $R2'$, the gazing score S increases. Herein, the extent of increase in the gazing score S is decided according to the function form of $f(S_t)$ in Equation (1).

In the area $R_3$, the viewpoint P of the user U is on the target object ob for gazing, the angular velocity ω is smaller than the predetermined threshold value $\omega_{th}$, and the head region of the user U is rotating in the direction of decrease in the angle α. Hence, the gazing score S increases.

In the area $R_4$, although the viewpoint P of the user U is on the target object ob for gazing and the head region of the user U is rotating in the direction of increase in the angle α, the angular velocity ω is smaller than the predetermined threshold value $\omega_{th}$. Hence, the gazing score S increases. At a timing t', the gazing score S becomes equal to or greater than the determination threshold value $S1_{th}$, and thus the determining unit 109 determines that the gazing state is attained in which the user U is gazing at the object ob.

Even after the gazing score S has reached the determination threshold value $S1_{th}$, the score calculation is continued. Alternatively, after having reached the determination threshold value $S1_{th}$, the gazing score S can be maintained at the threshold value.

The area $R_5$ indicates the state in which the viewpoint P of the user U moves away from the object ob under the gazing state to another object ob. Since the viewpoint P of the user U has moved away from the object ob under the gazing state, the gazing score S decreases.

When the viewpoint P of the user U moves away from the object ob having the gazing score S greater than the threshold value, the gazing score calculating unit 107 can calculate the gazing score S in such a way that there is a decrease in the gazing score S as illustrated in FIG. 5. When the viewpoint P of the user U moves away from the object ob, the gazing score S decreases and, when it becomes smaller than the determination threshold value $S1_{th}$, the gazing state can be terminated. The operations can be performed in such a way that the gazing score S becomes equal to zero immediately after the away movement of the viewpoint P. As a result of performing such operations, immediately after the target object ob for gazing for the user U has been changed from the object ob being gazed to another object ob, the gazing state can be terminated.

[Display Control Unit 111]

The display control unit 111 controls, according to the gazing score S for the object ob, at least either the display method for displaying that object ob in the display screen or the display content regarding that object ob.

Figure 6A:
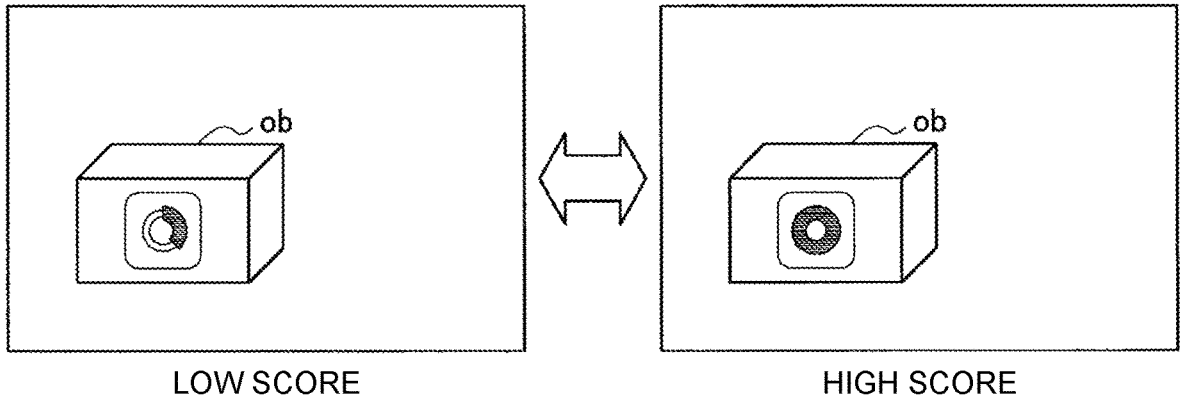
FIG. 6A is an explanatory diagram for explaining an example of the display form of an object ob according to the concerned embodiment.

For example, as illustrated in FIGS. 6A to 6E, the display control unit 111 controls the display method for the object ob according to the gazing score S. In FIG. 6A is illustrated an example in which the gazing score S for the object ob is displayed in the form of a meter display. The display control unit 111 can perform the display in such a way that the meter reading increases or decreases according to the increase or decrease in the gazing score S for the object ob.

Figure 6B:
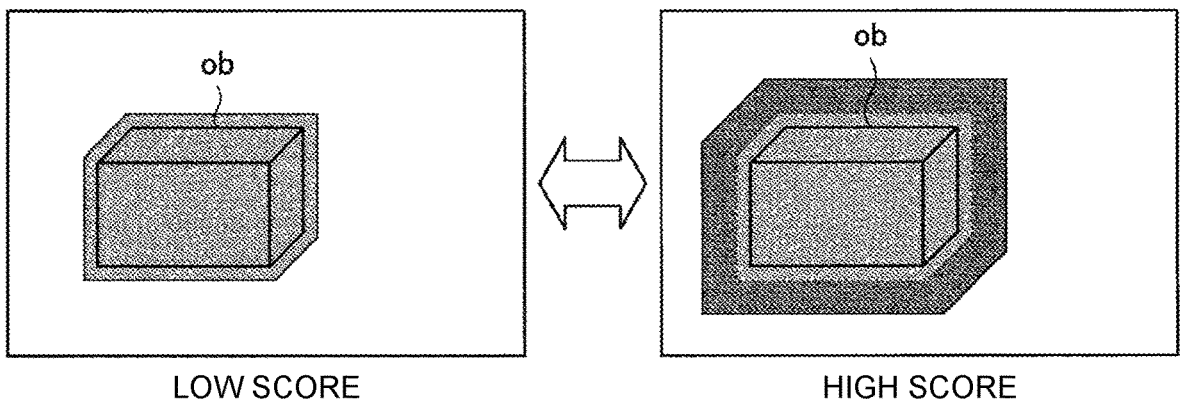
FIG. 6B is an explanatory diagram for explaining an example of the display form of the object ob according to the concerned embodiment.
Figure 6C:
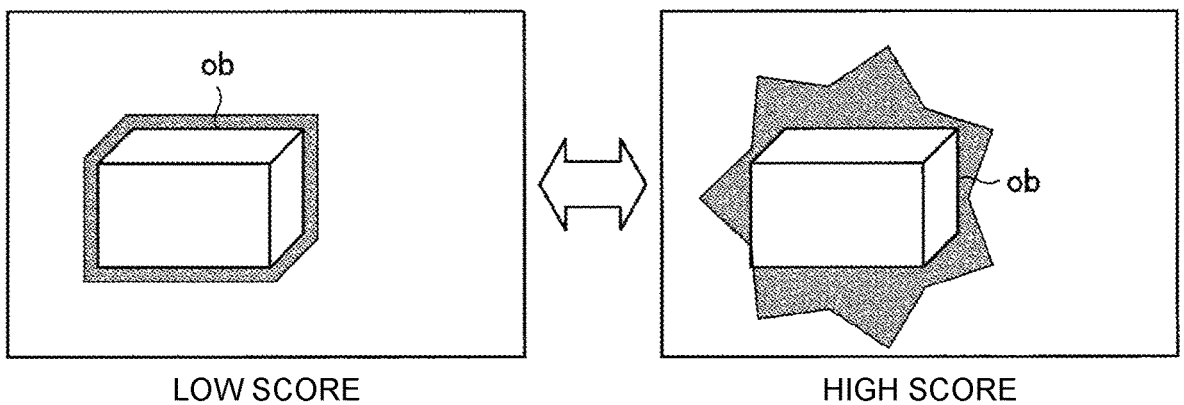
FIG. 6C is an explanatory diagram for explaining an example of the display form of the object ob according to the concerned embodiment.

Meanwhile, in the case of displaying the selected object ob in an enclosed manner, the display control unit 111 can perform the display with an expression that makes visual recognition easier for the user U as the gazing score S goes on increasing. For example, as illustrated in FIGS. 6B and 6C, depending on the gazing score S, the display control unit 111 can highlight, in a phased manner, the object ob by changing the aspects such as the surrounding color, the transparency, and the selection expression of the object ob.

Moreover, as illustrated in FIG. 6D, the display control unit 111 can change the display size of the target object ob according to the gazing score S.

For example, an image of the object ob can be obtained using a camera that is installed in the information processing device 10 according to the first embodiment and that recognizes the external space; and the display control unit 111 can display that image in a superimposed manner on the object ob. Then, the display control unit 111 can change the size of the superimposed image of the object ob according to the gazing score S and provide it to the user U.

Meanwhile, the number of objects ob that are displayed with a changed display size is not limited to one and it is also possible to display a plurality of objects ob by changing their sizes. When the gazing scores S for a plurality of objects ob are within the range of predetermined values, the display control unit 11 can display the objects ob in an enlarged manner.

Furthermore, as illustrated in FIG. 6E, regarding an object ob that is only partially displayed, the display control unit 111 can display that object ob by moving it according to the gazing score S.

For example, in an identical manner to the description given above, an image of the object ob is taken using the camera that is installed in the information processing device 10 according to the first embodiment and that recognizes the external space; and the display control unit 111 can provide the taken image, which is superimposed on the object ob, by moving it according to the gazing score S.

The selection expressions explained above can be used in an individual manner, or can be used in combination. Moreover, in the application concerned, the expression methods that are not explained herein but that change according to the gazing score S are also assumed to be included.

The selection expression that is displayed by the display control unit 111 can change on a continuous basis accompanying the increase or decrease of the gazing score S; or such a selection expression can be used for which one or more threshold values are set in advance and which changes in a phased manner. More particularly, when the gazing score S is equal to or greater than a predetermined threshold value, the display control unit 111 can display the object ob according to a predetermined selection expression. Moreover, regarding an object ob for which the gazing score S becomes equal to or smaller than the predetermined threshold value, the selection expression for that object ob can be reset.

Figure 7:
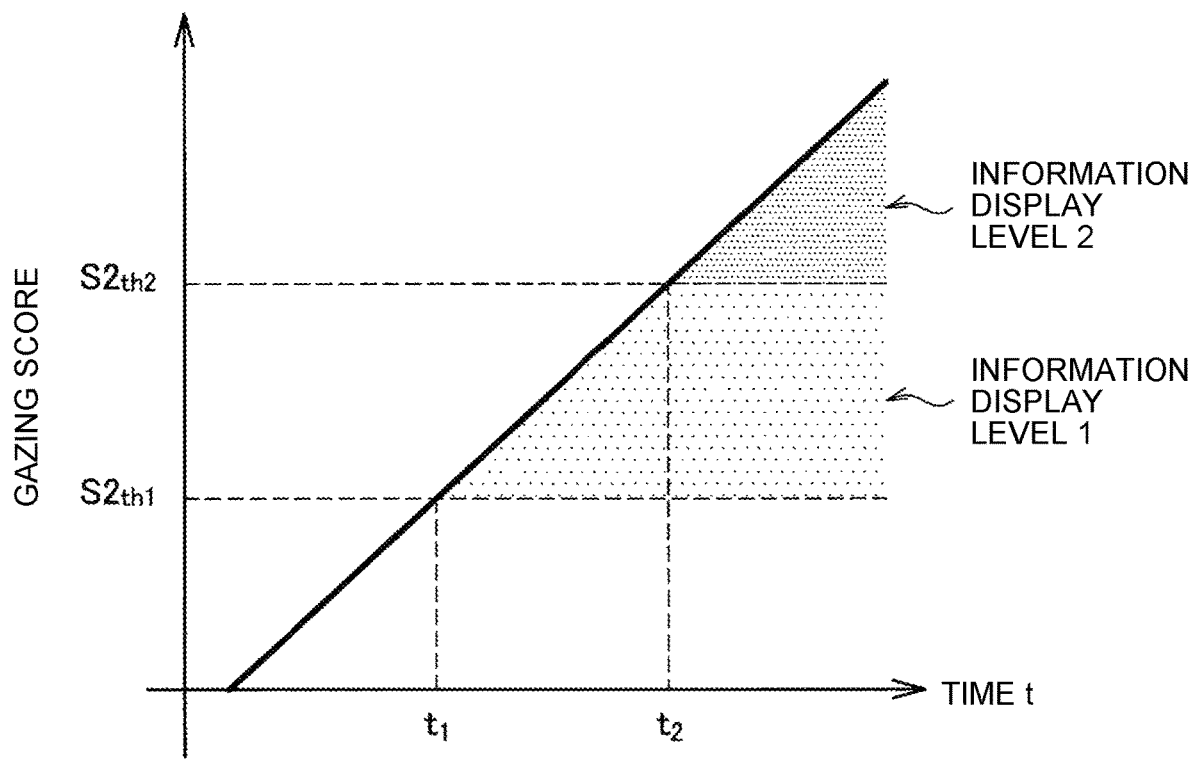
FIG. 7 is an explanatory diagram for explaining the display method for displaying object information according to the concerned embodiment.
Figure 8:
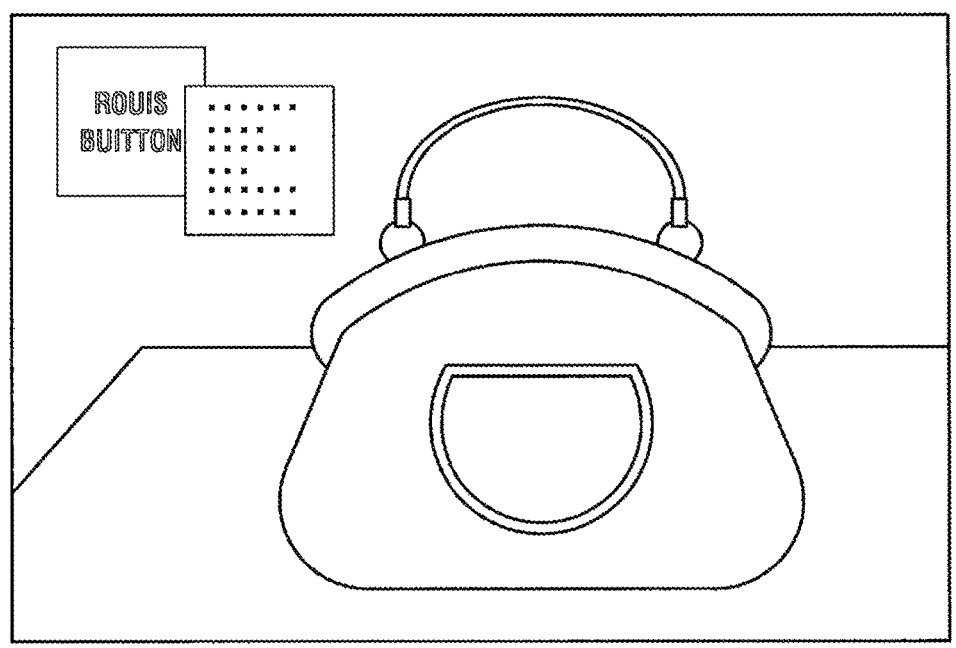
FIG. 8 is an explanatory diagram for explaining the display method for displaying object information according to the concerned embodiment.
Figure 9:
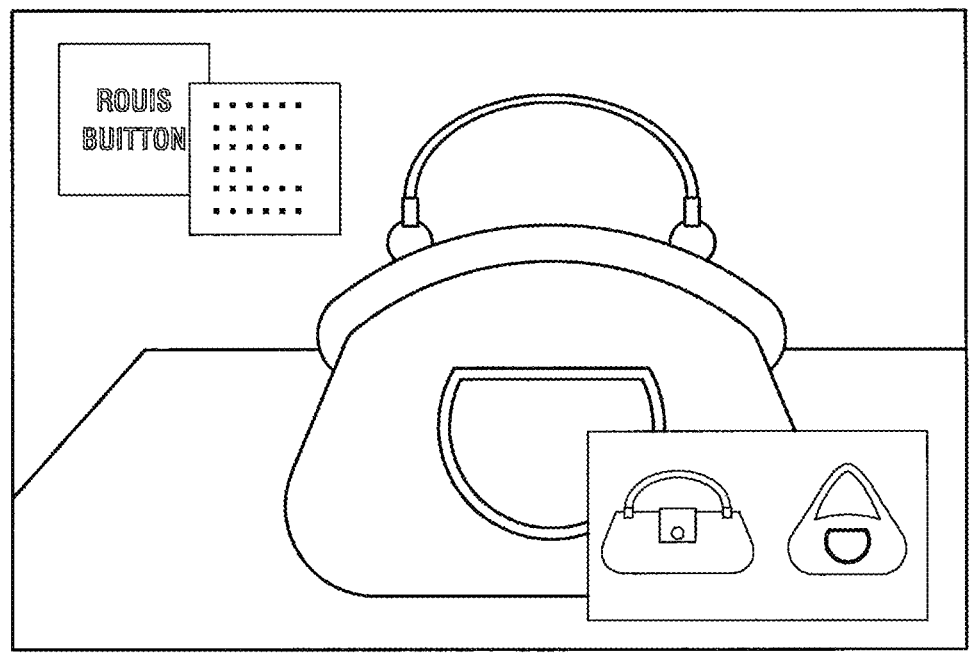
FIG. 9 is an explanatory diagram for explaining the display method for displaying object information according to the concerned embodiment.

Meanwhile, as illustrated in FIGS. 7 to 9, according to the gazing score S, the object information related to the object ob can be displayed. FIG. 7 is an explanatory diagram for explaining the display method for displaying the object information. FIGS. 8 and 9 are schematic diagrams illustrating examples of the image displayed in the object information.

More particularly, the display control unit 111 can display, according to the gazing score S, the information set with respect to an object ob, such as the information containing the name and the category of the object ob. For example, when the object ob is a product, the display control unit 111 can display, according to the object ob, the information such as the quantity of inventory, the sale priority, and the sale period.

As illustrated in FIG. 7, display threshold values $S2_{th}$ are set with respect to the gazing score S for the purpose of displaying the object information and, when the gazing score S is equal to or greater than a display threshold value $S2_{th}$, the display control unit 111 displays the object information at the corresponding information display level which enables superimposition of the object information within the eyesight of the user U. For example, when the gazing score S for the object ob becomes equal to or greater than a display threshold value $S2_{th1}$, as illustrated in the top left side in FIG. 8, first-type object information belonging to an information display level 1 is displayed to the user U. The displayed first-type object information can be, for example, the fundamental information related to that object ob. More particularly, when the concerned object ob is a product such as a bag displayed in the shelf of a shop, the display control unit 111 can display the information such as the brand name and the price of that product.

As illustrated in FIG. 7, when the gazing score S for the object ob becomes equal to or greater than a display threshold value $S2_{th2}$, as illustrated in the bottom right side in FIG. 9, second-type object information belonging to a display level 2 is displayed to the user U. As compared to the first-type object information, the second-type object information can be set to be more detailed information. For example, when the object ob is a product, the second-type object information can be set as the information related to objects ob that have the same category as the concerned object ob and that are already in possession of the user U. When the object ob is a product, the display control unit 111 can display the information about the attributes of the user U, such as the gender, the height, and the age of the user U who is recommended to use that product; can display the information about the situation in which the use of the product is recommended; and can display the information such as similar possessions of the user U to the concerned product.

The display control unit 111 can remove the object information displayed immediately after the away movement of the viewpoint P of the user U from the concerned object ob. Moreover, also when the gazing score S becomes smaller than the predetermined display threshold value $S2_{th}$, the display control unit 111 can remove the corresponding displayed object information.

Figure 10B:
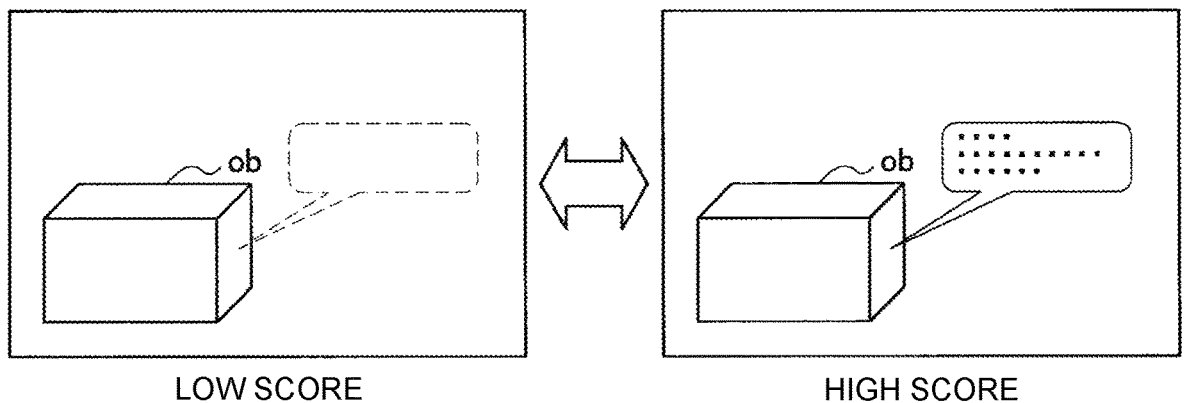
FIG. 10B is an explanatory diagram for explaining an example of the display form of the object ob according to the concerned embodiment.

Furthermore, the display control unit 111 can vary the method of presenting the object information according to the gazing score S. FIGS. 10A and 10B are explanatory diagrams for explaining the method of presenting the object information according to the gazing score S.

For example, when the viewpoint P of the user U is set on the object ob, as illustrated in FIG. 10A, a leader line is displayed to be emerging from the object ob. As the gazing score S becomes higher, the leader line becomes elongated and, when the information display level is reached, the object information can be displayed. Moreover, for example, as illustrated in FIG. 10B, a word balloon coming from the object ob can be displayed; the degree of transparency or the extent of blurring of the word balloon can be varied according to the gazing score S; and when the information display level is reached, predetermined object information can be displayed.

[Communication Control Unit 113]

The communication control unit 113 has a communication control function for obtaining, via the network 30, the object information stored in the server 20 and the user information related to the attributes of the user U; and sending the object information and the user information to the display control unit.

[Memory Unit 115]

The memory unit 115 is an example of a memory device installed in the information processing device 10 according to the first embodiment. The memory unit 115 is used to register various programs and databases to be used by the information processing device 10 in performing various operations as described above. Moreover, the memory unit 115 can also be used to record, as history information, a variety of information obtained by the viewpoint information obtaining unit 101 and the position-related information obtaining unit 103. Furthermore, the memory unit 115 can also be used to record various parameters and intermediate operation results that need to be stored during the operations performed by the gazing score calculating unit 107 and the determining unit 109. Moreover, not limiting the information to be stored to the information handled during the operations performed by the gazing score calculating unit 107 and the determining unit 109, the memory unit 115 can also be used to record various parameters and intermediate operation results that need to be stored during any operations performed in the information processing device 10 according to the first embodiment. The memory unit 115 is freely readable/writable for the viewpoint information obtaining unit 101, the position-related information obtaining unit 103, the head rotation information obtaining unit 105, the gazing score calculating unit 107, and the determining unit 109.

Till now, the detailed explanation was given about an exemplary configuration of the information processing device 10. The abovementioned constituent elements can be configured using general-purpose members or circuits, or can be configured using hardware specialized to implement the functions of the constituent elements. Moreover, the functions of the constituent elements can be entirely implemented by a CPU. Thus, according to the technical level at the time of implementing the first embodiment, the configuration can be appropriately modified.

Given below is the detailed explanation of an example of the operations performed in the information processing device 10.

<<Operations>>

Operation Example 1

Figure 11:
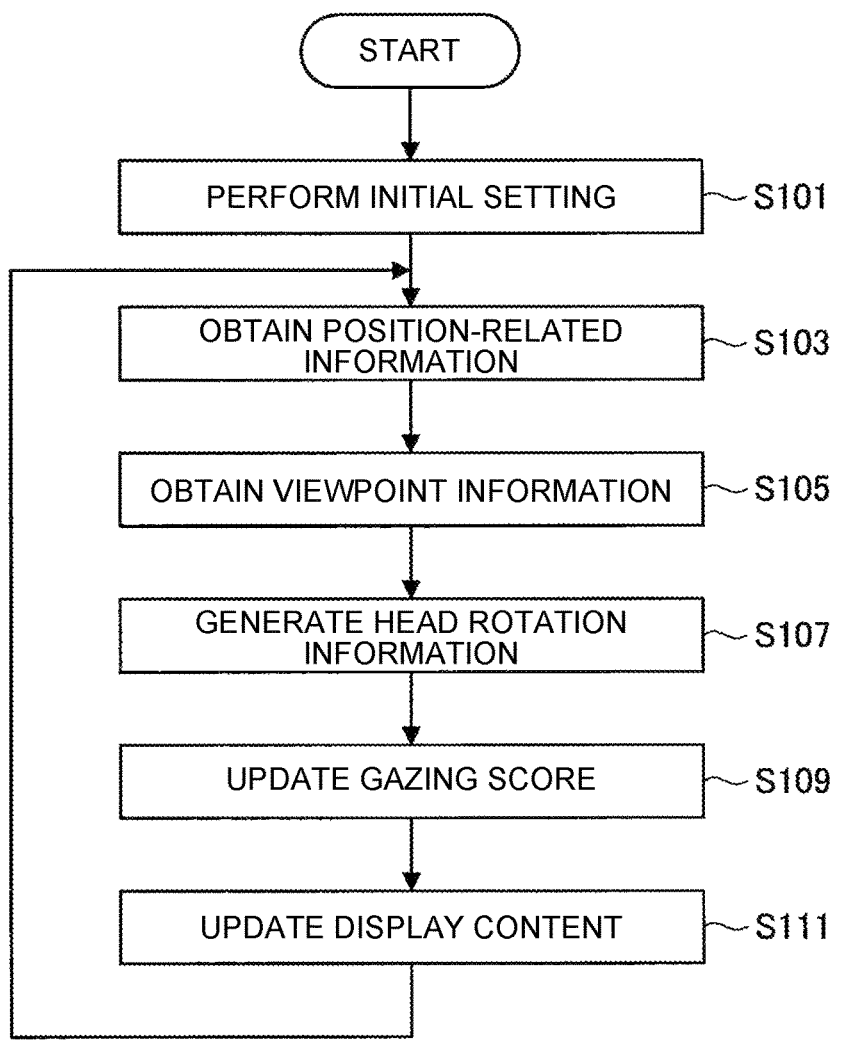
FIG. 11 is a flowchart for explaining an example of the flow of operations performed according to the concerned embodiment.

Explained below with reference to FIG. 11 are the operations performed in the information processing device 10 according to the first embodiment. FIG. 11 is a flowchart for explaining an example of the flow of operations performed in the information processing device 10 according to the first embodiment.

Firstly, the initial setting is done in the information processing device 10 according to the first embodiment (S101). In the space in which the user U of the information processing device 10 is present, the global coordinate system is set that represents the three-dimensional rectangular coordinate system having a predetermined position as the origin. Moreover, a device coordinate system related to the information processing device 10 is set that has the position of the user U of the information processing device 10 as the origin and that is in the same direction as the coordinate axis of the global coordinate system.

Moreover, the initial setting is done for the purpose of calculating the gazing score S. More specifically, calculation formulae can be set that not only can reflect the head rotation information but can also reflect the distance between the user U and the object ob representing one part of the position-related information and reflect the distance d from the object center C to the viewpoint P of the user U as calculated based on the position information and the position-related information. Moreover, the calculation formulae that are set can also reflect the user information containing the characteristics of the user U and the information characterizing the preferences of the user U. For example, Equations (1) and (2) given earlier can be set as the gazing score calculation formulae.

Furthermore, in the concerned initial setting, the threshold value $S1_{th}$ is set for use by the determining unit 109 for determining the gazing state. The information display threshold values $S2_{th}$ are set, as may be necessary, for use by the display control unit 111 for displaying the object information.

The determination threshold value $S1_{th}$ and the information display threshold values $S2_{th}$ can be set based on all of the information handled in the information processing device 10 according to the first embodiment. For example, the determination threshold value $S1_{th}$ and the information display threshold values $S2_{th}$ can be set using the distance between the user U and the object ob representing one part of the position-related information; the distance d from the object center C to the viewpoint P as calculated based on the viewpoint information and the position-related information; and the user information containing information about the characteristics of the user U and information that characterizes the preferences of the user U.

When the initial setting is done in the information processing device 10, the position-related information obtaining unit 103 obtains the position-related information (S103). More particularly, the position of the user U corresponding to his or her head rotation center is obtained; the object center C is obtained; the distance between the user U and the object ob is obtained; and the angle α is obtained that is formed by the straight line joining the head rotation center and the object center C with the direction in which the user U is facing.

Then, the viewpoint information obtaining unit 101 obtains the viewpoint information related to the position of the viewpoint P of the user U (S105).

Then, the head rotation information obtaining unit 105 obtains the angular velocity ω accompanying the rotation of the head region of the user U and obtains the head rotation information related to the direction of rotation of the head region (S107). The head rotation information is obtained by calculating the changes in the angle α formed by the straight line that corresponds to the position of the user U and that joins the head rotation center and the object center C with the head direction ud of the user U as obtained by the position-related information obtaining unit 103. The head rotation information obtaining unit 105 detects the angle $α_{t1}$ the timing $t_1$ and detects the angle $α_{t2}$ at the timing $t_2$; and calculates the angular velocity ω and the rotation direction using the detected angles $α_{t2}$ and $α_{t2}$.

After the head rotation information is obtained, the gazing score calculating unit 107 calculates the gazing score S for the object ob (S109). More specifically, the calculation formulae set at S101 are used, and the gazing score S for the object ob is calculated based on the position-related information, the viewpoint information, and the head rotation information obtained at S103 to S107.

Then, the display control unit 111 highlights the object ob using a display method that is in accordance with the gazing score S (S111). The operations from S103 to S111 are sequentially repeated and, when the gazing score S for the object ob becomes equal to or greater than the determination threshold value $S1_{th}$, it is determined that the gazing state is attained. Moreover, the object information is displayed in which contents are in accordance with the information display level to which the gazing score S belongs.

Subsequently, for example, when the viewpoint P of the user U moves away from the object ob determined to be under the gazing state, the gazing score S goes on decreasing and the gazing state can be terminated. Moreover, when the viewpoint P of the user U moves away from the object ob for which the object information was displayed, the gazing score S goes on decreasing and the displayed object information is removed. Alternatively, the termination of the gazing state and the removal of the object information can be performed by resetting the gazing score S to the initial value immediately after the away movement of the viewpoint P of the user U from the concerned object ob.

Till now, the detailed explanation was given about an example of the operations of the information processing device 10 according to the first embodiment. Given below is the detailed explanation of another operation example.

Operation Example 2

In the operation example 1, the explanation was given for the case in which, based on the viewpoint information obtained by the viewpoint information obtaining unit 101, the gazing score calculating unit 107 calculates the gazing score S when the viewpoint P of the user U is set on the object ob. However, alternatively, the gazing score S for the object ob can be calculated even when the viewpoint P of the user U is not set on the object ob.

Figure 12:
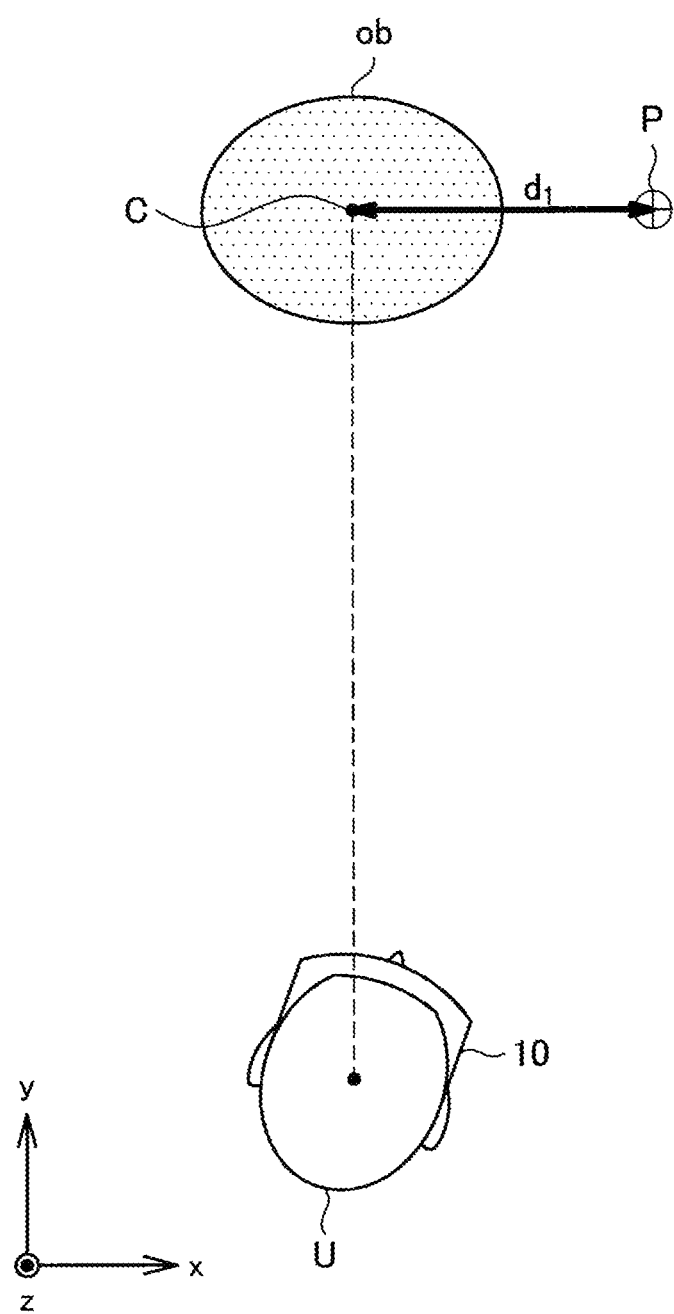
FIG. 12 is an explanatory diagram for explaining an example of the operations according to the concerned embodiment.

More particularly, as illustrated in FIG. 12, a distance $d_1$ from the object center C to the viewpoint P of the user U can be calculated, and the gazing score S can be calculated according to the distance $d_1$. For example, the gazing score calculating unit 107 can set a calculation formula in which the distance $d_1$ serves as one of the variables for calculating the gazing score S, so that the gazing score S can be calculated to increase in inverse proportion to the distance $d_1$.

Figure 13:
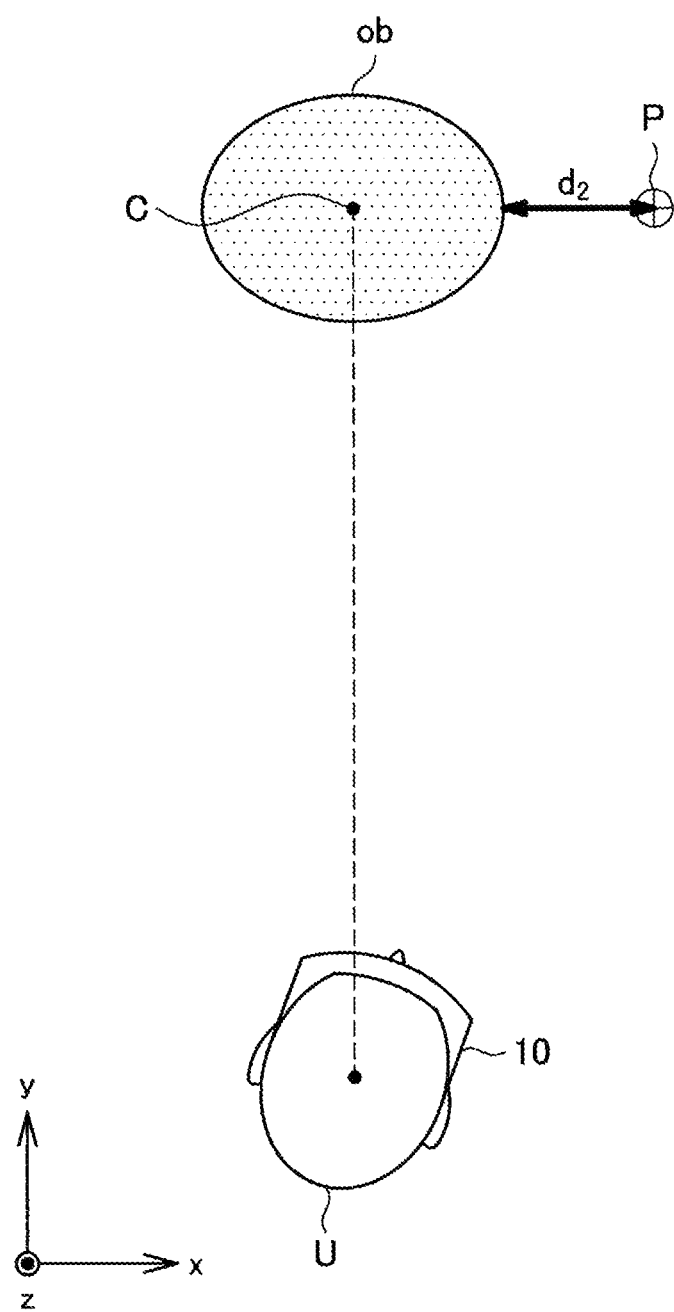
FIG. 13 is an explanatory diagram for explaining an example of the operations according to the concerned embodiment.

Meanwhile, not limiting the calculation of the gazing score S to the distance from the object center C to the viewpoint P of the user U, as illustrated in FIG. 13, the gazing score S can also be calculated according to a distance $d_2$ between the edge of the object ob and the viewpoint P of the user U.

When the object information is to be displayed by the display control unit 111, the gazing score calculating unit 107 can set the information display threshold values $S2_{th}$ to be dependent on the distances $d_1$ and $d_2$, so that the display control unit 111 can control the timings of displaying the object information.

The determining unit 109 can perform gazing determination using the gazing score S calculated in the manner described above. The determination threshold value $S1_{th}$ to be used in the gazing determination can be dependent on the distance $d_1$ or the distance $d_2$. As a result, the determining unit 109 can change the timing of the gazing determination.

Operation Example 3

The gazing score calculating unit 107 can calculate the gazing score S further according to the distance between the user U and the object ob representing one part of the position-related information.

More particularly, the position-related information obtaining unit 103 obtains the distance between the user U and the object ob as the position-related information, and sends the position-related information to the gazing score calculating unit 107. Then, the gazing score calculating unit 107 sets a gazing score calculation formula in which the distance is one of the variables, and the gazing score S can be calculated to increase in inverse proportion to the distance.

Moreover, the gazing score calculating unit 107 can calculate the gazing score S according to a velocity v of the user U with respect to the object ob (i.e., the temporal changes in the distance between the user U and the object ob) representing one part of the position-related information.

That is, the position-related information obtaining unit 103 obtains the velocity v of the user U with respect to the object ob as the position-related information, and sends the position-related information to the gazing score calculating unit 107. The gazing score calculating unit 107 can set the gazing score calculation formula as the function of the velocity v and calculate the gazing score S to increase m inverse proportion to the velocity v.

The determining unit 109 can perform gazing determination using the gazing score S calculated according to the method described above. The determining unit 109 can set the determination threshold value $S1_{th}$, which is used in the gazing determination, with the distance reflected therein, so that the gazing determination according to the distance can be performed.

Operation Example 4

The gazing score calculating unit 107 can calculate the gazing score S further based on the user information that is set in advance and that contains the characteristics of the user and the information characterizing the preferences of the user.

For example, as illustrated in FIG. 14, the user information contains the gender, the height, the hobbies, and the schedule of each user. The user information is stored in the devices having the information storage function, such as the memory unit 115 and the server 20.

For example, in the case in which a user performs shopping while using the information processing device according to the first embodiment, the gazing score calculating unit 107 can calculate the user-by-user gazing score S using a calculation formula that enables easy calculation of a high gazing score with respect to an object ob related to the user information, such as apparel suitable to the user information indicating the gender and the height of the user U.

The user information can also have the user schedule registered therein; and the gazing score S regarding the things related to the registered schedule, such as the things needed by the user to follow that schedule, can be calculated on a priority basis.

At the time of performing the gazing determination with respect to the object ob related to the user information, the determining unit 109 can set the determination threshold value $S1_{th}$ to be lower as compared to the objects ob not related to the user information.

When an object ob is not related to the user information, the gazing score calculating unit 107 can calculate the gazing score S using a calculation formula by which there is only a small increase in the gazing score S. In an identical manner, when an object ob is not related to the user information, the determining unit 109 can increase the determination threshold value $S1_{th}$ and delay the timing of gazing determination.

Operation Example 5

The gazing score calculating unit 107 can calculate the gazing score S further based on the object information set in advance as illustrated in FIG. 15. Moreover, for example, if the objects ob are products displayed in a show window and the sales company is promoting products of a predetermined category or promoting predetermined products, the object information can have priority information set therein. Then, the gazing score calculating unit 107 can set a calculation formula for each object according to the set priority, and calculate the corresponding gazing score S.

In an identical manner, the determining unit 109 too can determine the gazing state further based on the object information. When the priority is set in the object information, the determining unit 109 can set the determination threshold $S1_{th}$ with respect to an object ob in the category having a high priority to be lower as compared to the objects ob of other categories having a low priority.

Operation Example 6

The gazing score calculating unit 107 can calculate the gazing score S further based on the history information. More particularly, when the gazing score is to be calculated for an object ob that has already been viewed by the user U, the gazing score calculating unit 107 can change the gazing score calculation formula and the information display threshold value $S2_{th}$ according to the history information such as the number of times or the frequency for which the gazing state is determined to have been attained.

In an identical manner to the explanation given earlier, the determining unit 109 can perform gazing determination by changing the determination threshold value $S1_{th}$ for each object.

The operations described above are not limited to be performed for the objects ob that are identical to an object ob already viewed by the user U, but can also be performed for the objects belonging to the same category as an already-seen object ob.

Operation Example 7

As illustrated in FIG. 16, the display control unit 111 can refer to the history information such as the object information and the gazing scores, and can display object images that satisfy predetermined conditions. More particularly, the user U sets image display conditions based on a variety of information such as the date and time of gazing, the place of gazing, the gazing score S, and the category of the object ob as illustrated in FIG. 17. Then, the display control unit 111 can display, to the user U according to a predetermined display method, object images satisfying the search condition. For example, as illustrated in FIG. 16, regarding the objects ob included a predetermined category viewed by the user U within a predetermined period of time, the display control unit 111 can display the objects ob m descending order of the cumulative gazing scores S. At that time, the display control unit 111 can also display the object information corresponding to the displayed object images.

Because of such a function, for example, the user U becomes able to review the objects ob which are of the category of interest for him or her and at which he or she had gazed within a predetermined period of time.

Meanwhile, as long as the device for displaying the object information is a device enabling display of information, there is no particular restriction on the device. Thus, the information processing device 10 according to the first embodiment can be equipped with a display, and the display control unit 111 can display the object information in that display. Alternatively, the display control unit 111 can display the object information in a smartphone or a TV.

In the first embodiment, the explanation is given mainly about the calculation of the gazing score S and the determination of the gazing state mainly with respect to stationary objects ob. However, the application concerned can also be implemented with respect to moving objects.

For example, the information processing technology according to the first embodiment can be used with respect to an object such as some kind of target displayed in a game being played.

The application concerned represents the technology for detecting the extent of gazing according to the viewpoint information of the user U and the head-related information such as the rotation direction of the head region of the user U with respect to the object ob and the angular velocity accompanying the rotation of the head region, and for performing the gazing determination. Thus, for example, the application concerned is capable of effectively displaying predetermined contents with respect to moving objects at the user-intended timing in an environment such as the AR (Augmented Reality) environment or the VR (Virtual Reality) environment in which the field of view changes not only due to the viewpoint but also due to the head direction and the head position.

Second Embodiment

<<Configuration>>

Given below is the explanation of a second embodiment according to the application concerned. FIG. 18 is a block diagram illustrating a configuration of an information processing system 5 according to the second embodiment. The information processing system 5 is configured with an information processing device 50, a server 60, and a network 70. The server 60 and the network 70 are fundamentally identical to the server 20 and the network 30 in the information processing system 1. Hence, that explanation is not given again.

<Information Processing Device 50>

The information processing device 50 includes an imaging device 510 and a display control device 550. The imaging device 510 according to the second embodiment has the function of taking images of at least some part of the space in which the information processing device 50 is installed, and generating taken images. The imaging device 510 according to the second embodiment can use a known imaging device having the imaging function, such as a digital still camera or a digital video camera. The display control device 550 according to the second embodiment has the function by which, based on the taken images obtained by the imaging device 510, the position-related information, and the viewpoint information of a person present in the imaging space, control is performed regarding the display method and the display contents of the information to be displayed at predetermined positions in that space.

[Imaging Device 510]

The imaging device 510 obtains the position-related information and the viewpoint information within the imaging space.

It is possible to use various known technologies for obtaining the position-related information of a person present in the imaging space by using the taken images generated by the imaging device 510. For example, it is possible to appropriately use various position estimation technologies, such as the technologies disclosed in Japanese Patent Application Laid-open No. 2010-16743, Japanese Patent No. 5869883, and Japanese Patent Application Laid-open No. 2017-182739.

Moreover, it is possible to use various known technologies for extracting the viewpoint information of a person present in the imaging space by using the taken images generated by the imaging device 510. For example, it is possible to appropriately use various line-of-sight estimation technologies, such as the technologies disclosed in Japanese Patent Application Laid-open No. 2005-230049, Japanese Patent Application Laid-open No. 2015-153302, and Japanese Patent Application Laid-open No. 2017-169685.

Meanwhile, the method for obtaining the position-related information and the viewpoint information according to the second embodiment is only exemplary, and is not limited to the examples given above.

Moreover, the imaging device 510 can also have functions equivalent to the functions of a head rotation information obtaining unit 551, a gazing score calculating unit 553, and a determining unit 555 that are described later.

[Display Control Device 550]

As illustrated in FIG. 19, the display control device 550 includes at least a display control unit 557, a communication control unit 559, and a memory unit 561; and can also include the head rotation information obtaining unit 551, the gazing score calculating unit 553, and the determining unit 555 as may be necessary. FIG. 19 is a block diagram illustrating a configuration of the display control device 550 according to the second embodiment.

The head rotation information obtaining unit 551, the gazing score calculating unit 553, the determining unit 555, the display control unit 557, the communication control unit 559, and the memory unit 561 are fundamentally identical to the head rotation information obtaining unit 105, the gazing score calculating unit 107, the determining unit 109, the display control unit 111, the communication control unit 113, and the memory unit 115, respectively, according to the first embodiment. Hence, that explanation is not given again.

Meanwhile, the display control device 550 need not have all of the functions described above, and alternatively can only have the function of displaying predetermined information in the space in which the information processing device 50 is installed. Regarding the head rotation information obtaining unit 551, the gazing score calculating unit 553, and the determining unit 555; as long as they have identical functions to the imaging device 510 or the server 60, they need not necessarily be disposed in the display control device 550. Alternatively, the head rotation information obtaining unit 551, the gazing score calculating unit 553, and the determining unit 555 can be disposed in a dispersed manner among the server 60, the imaging device 510, and the display control device 550.

<<Operations>>

Explained below with reference to FIGS. 20 and 21 are the operations performed in the information processing system 5 according to the second embodiment. FIG. 20 is a flowchart for explaining an exemplary flow of operations performed in the information processing system 5 according to the second embodiment. FIG. 21 is an explanatory diagram for explaining an example of the operations performed in the information processing system 5 according to the second embodiment.

Firstly, the initial setting is done in the information processing device 50 according to the second embodiment (S201). More particularly, the initial setting is done for the calculation of the gazing score S. More specifically, calculation formulae can be set in which, in addition to the head rotation information, the following information is also reflected: the distance between the person, who is present in the space in which the information processing device 50 is installed, and the object that represents one part of the position-related information and that is obtained from the taken image generated using the imaging device 510; and the distance d from the object center to the viewpoint P of that person as calculated based on the viewpoint information and the position-related information. Moreover, the set calculation formulae can also reflect the user information containing information about the characteristics of that person and information characterizing the preferences of that person. For example. Equations (1) and (2) given earlier can be set as the gazing score calculation formulae.

Moreover, in the initial setting, a determination threshold value is set for enabling the determining unit 555 to determine the gazing state. Moreover, as may be necessary, an information display threshold values can also be set for use by the display control unit 557 at the time of displaying the object information.

The determination threshold value and the information display threshold values can be set based on all information handled in the information processing device 50 according to the second embodiment. For example, the determination threshold value and the information display threshold values can be set according to the distance between the person, who is present in the space in which the information processing device 50 is installed, and the object that represents one part of the position-related information; the distance from the object center to the viewpoint P of that person as calculated based on the viewpoint information and the position-related information; and the user information containing information about the characteristics of that person and information characterizing the preferences of that person.

When the initial setting is done in the information processing device 50, the imaging device 510 performs imaging of at least some part of the space in which the information processing device 50 is installed and, based on the taken image, obtains the position-related information related to the object placed in the space and the position of the person (S203). More particularly, the position information is obtained regarding the person present in the space in which the information processing device 50 is installed; the object center is obtained; the distance information is obtained regarding the distance between that person and the object; and the angle information is obtained regarding the angle formed by the straight line joining the head rotation center of the person and the object center with the direction in which the person is facing. Then, the imaging device 510 obtains the viewpoint information from the obtained image using a known viewpoint information obtaining technology (S205).

Subsequently, the head rotation information obtaining unit 551 obtains the head rotation information related to the angular velocity that accompanies the rotation of the head region of the person present in the space in which the information processing device 50 is installed, and related to the changes in the angular velocity (S207). More particularly, the head rotation information obtaining unit 551 detects the temporal changes in the orientation of the head region of the person appearing in the image obtained by the imaging device 510, and obtains the head rotation information.

After the head rotation information is obtained, the gazing score calculating unit 553 calculates the gazing score S for the object (S209). More specifically, the calculation formulae set at S201 are used; and the gazing score S for the object ob is calculated based on the position-related information, the viewpoint information, and the head rotation information obtained at S203 to S207.

Then, the display control unit 557 highlights the object using the display method corresponding to the gazing score S (S211). The operations from S203 to S211 are performed in a repeated manner and, when the gazing score S for the object becomes equal to or greater than the determination threshold value, the determining unit 555 determines that the gazing state is attained in which the person, who is present in the space in which the information processing device 50 is installed, is gazing at the object. Moreover, when the calculated gazing score S becomes equal to or greater than an information display threshold value and reaches an information display level, the display control device 550 displays the object information according to that information display level as illustrated in FIG. 21. As long as the object information is displayed at a viewable position for the person present in the space in which the information processing device 50 is installed, it serves the purpose. Thus, the object information can be displayed in the vicinity of the object, or can be displayed in a predetermined screen. Meanwhile, when the concerned person is looking at the object information, the gazing score calculating unit 553 need not vary the gazing score and maintain it at a constant value.

Subsequently, for example, when the viewpoint P of the person, who is present in the space in which the information processing device 50 is installed, moves away from the object determined to be under the gazing state or from the object whose object information is displayed, the gazing state can be terminated because of a decrease in the gazing score S, and the displayed object information can be removed.

<<Hardware Configuration>>

Till now, the explanation was given about the embodiments of the application concerned. The information processing described above is implemented as a result of cooperation achieved between software and hardware of the information processing device as described below.

FIG. 22 is a block diagram illustrating a hardware configuration of the information processing device according to the embodiments. The information processing device includes a CPU (Central Processing Unit) 901, a ROM (Read Only Memory) 902, a RAM (Random Access Memory) 903, a host bus 904, a bridge 905, an external bus 906, an interface 907, a storage device (HDD) 911, and a network interface 913. The information processing device according to the embodiments can also include an input device 908, a display device 909, a sound output device 910, and a drive 912.

The CPU 901 functions as an arithmetic processing device and a control device, and controls the overall operations in the information processing device according to various programs. Alternatively, the CPU 901 can be a microprocessor. The ROM 902 is used to store programs and operation parameters to be used by the CPU 901. The RAM 903 is used to temporarily store programs to be used in the execution performed by the CPU 901, and parameters that undergo changes during that execution. The abovementioned constituent elements are connected to each other by the host bus 904 configured with a CPU bus. The functions of the head rotation information obtaining unit 105, the gazing score calculating unit 107, and the determining unit 109 can be implemented as a result of cooperation among the CPU 901, the ROM 902, the RAM 903, and the software.

The host bus 904 is connected to the external bus 906, such as a PCI (Peripheral Component Interconnect/Interface) bus, via the bridge 905. Meanwhile, the host bus 904, the bridge 905, and the external bus 906 need not always be separately configured, and their functions can be installed m a single bus.

The input device 908 can be configured with an input unit for inputting information using members such as a touch panel, buttons, a microphone, sensors, switches, and livers; and with an input control circuit that generates input signals based on the input from the members and outputs the input signals to the CPU 901.

The display device 909 includes, for example, a CRT (Cathode Ray Tube) display device, a liquid crystal display (LCD) device, a projector device, an OLED (Organic Light Emitting Diode) device, or a lamp.

The storage device 911 is a device for data storage configured as an example of the memory unit of the information processing device according to the embodiments. The storage device 911 can include a memory medium, a recording medium for recording data in the memory medium, a reading device for reading data from the memory medium, and a deleting device for deleting the data recorded in the memory medium. The storage device 911 is configured with, for example, an HDD (Hard Disk Drive), or an SSD (Solid Storage Drive), or a memory having equivalent functions. The storage device 911 drives the storage, and stores the programs to be executed by the CPU 901 and stores a variety of data.

The drive 912 is a reader/writer for memory medium, and either is embedded in the information processing device or is attached externally. The drive 912 reads the information recorded in a removable memory medium 92 such as a magnetic disk, an optical disk, a magneto-optical disk, or a semiconductor memory that is attached, and outputs the read information to the RAM 903 or the storage device 911. Moreover, the drive 912 can also write information in the removable memory medium 92.

The network interface 913 is a communication interface configured with a communication device meant for establishing connection with the network 30. Moreover, the network interface 913 can alternatively be a wireless LAN (Local Area Network) compatible terminal or a wired terminal that performs wired communication.

<<Summary>>

Although the application concerned is described above in detail in the form of preferred embodiments with reference to the accompanying drawings; the technical scope of the application concerned is not limited to the embodiments described above. That is, the application concerned is to be construed as embodying all modifications such as other embodiments, additions, alternative constructions, and deletions that may occur to one skilled in the art that fairly fall within the basic teaching herein set forth.

Moreover, the effects described in the present written description are only explanatory and exemplary, and are not limited in scope. That is, in addition to or in place of the effects described above, the technology disclosed in the application concerned enables achieving other effects that may occur to one skilled in the art.

Meanwhile, a configuration as explained below also falls within the technical scope of the application concerned.

(1)

An information processing device comprising:

a viewpoint information obtaining unit that obtains viewpoint information related to viewpoint of user;

a position-related information obtaining unit that obtains position-related information related to position of the user and position of predetermined object;

a head rotation information obtaining unit that obtains head rotation information related to angular velocity accompanying rotation of head region of the user and related to changes in the angular velocity; and a determining unit that, based on a gazing score which is calculated for each object according to the position-related information and the head rotation Information and which indicates extent of gazing of the user with respect to the object, determines whether or not the user is gazing at the object.

(2)

The information processing device according to (1), wherein, when the gazing score for the object is equal to or greater than a predetermined threshold value, the determining unit determines that gazing state is attained in which the user is gazing at the object.

(3)

The information processing device according to (1) or (3), further comprising a gazing score calculating unit that calculates a gazing score based on the viewpoint information, the position-related information, and the head rotation information.

(4)

The information processing device according to (3), wherein the gazing score calculating unit calculates the gazing score based on a gazing score calculated at previous calculation timing, and based on a gazing score addition amount corresponding to the viewpoint information, the position-related information, and the head rotation information.

(5)

The information processing device according to (3) or (4), wherein the gazing score calculating unit calculates the gazing score according to distance between viewpoint of the user and predetermined position of the object, the distance being calculated from the viewpoint information and the position-related information.

(6)

The information processing device according to any one of (3) to (5), wherein the gazing score calculating unit calculates the gazing score according to distance between viewpoint of the user and center of the object, the distance being calculated from the viewpoint information and the position-related information.

(7)

The information processing device according to any one of (3) to (6), wherein the gazing score calculating unit calculates the gazing score according to distance between viewpoint of the user, which is on outside of the object, and edge of the object, the distance being calculated from the viewpoint information and the position-related information.

(8)
The information processing device according to any one of (3) to (7), wherein the gazing score calculating unit calculates the gazing score based on object information which is related to the object and which is as set in advance.

(9)
The information processing device according to any one of (3) to (8), wherein the gazing score calculating unit calculates the gazing score based on user information which characterizes preferences of the user and which is set in advance.

(10)
The information processing device according to any one of (3) to (9), wherein the gazing score calculating unit calculates the gazing score based on gazing score history information related to history of the gazing score.

(11)
The information processing device according to any one of (3) to (10), wherein
the position-related information contains distance information related to distance between the user and the object, and
the gazing score calculating unit calculates the gazing score according to the distance information.

(12)
The information processing device according to (3), wherein
the position-related information contains relative velocity information related to relative velocity of the user with respect to the object, and
the gazing score calculating unit calculates the gazing score according to the relative velocity information.

(13)
The information processing device according to any one of (1) to (12), further comprising a display control unit that controls at least either display method for displaying the object according to the gazing score of the object or display content of the object related to the object as provided according to the gazing score.

(14)
The information processing device according to any one of (1) to (13), wherein
when the gazing score for the object is equal to or greater than predetermined threshold value, the determining unit determines that gazing state is attained in which the user is gazing at the object, and
regarding the object under the gazing state, when the gazing score of the object is equal to or greater than predetermined threshold value, the display control unit displays object information related to the object as provided according to the gazing score.

(15)
The information processing device according to any one of (1) to (14), wherein, when the gazing score is equal to or greater than predetermined threshold value, the display control unit displays object information, which is related to the object and which is provided according to the gazing score, in a superimposed manner within field of view of the user.

(16)
The information processing device according to any one of (1) to (15), wherein the display control unit displays, in an enlarged manner, the object for which the gazing score is equal to or greater than threshold value.

(17)
The information processing device according to any one of (1) to (16), wherein
a plurality of sets of information regarding each of the objects is stored as related object information, and
the display control unit displays the object information according to predetermined condition from among the object information.

(18)
The information processing device according to any one of (1) to (17), further comprising a display control unit that controls at least either display method for displaying the object according to the gazing score of the object or display content of the object related to the object as provided according to the gazing score, wherein
information related to the object for which the gazing score is calculated by the gazing score calculating unit is stored as object history information, and
the display control unit refers to the stored object history information and outputs object information containing an image of the object matching with predetermined condition.

(19)
An information processing method comprising:
obtaining viewpoint information related to viewpoint of user;
obtaining position-related information related to position of the user and position of predetermined object;
obtaining head rotation information related to angular velocity accompanying rotation of head region of the user and related to changes in the angular velocity; and
determining, based on a gazing score which is calculated for each object according to the position-related information and the head rotation information and which indicates extent of gazing of the user with respect to the object, whether or not the user is gazing at the object.

(20)
A program that causes a computer to function as:
a viewpoint information obtaining unit that obtains viewpoint information related to viewpoint of user;
a position-related information obtaining unit that obtains position-related information related to position of the user and position of predetermined object;
a head rotation information obtaining unit that obtains head rotation information related to angular velocity accompanying rotation of head region of the user and related to changes in the angular velocity; and
a determining unit that, based on a gazing score which is calculated for each object according to the position-related information and the head rotation information and which indicates extent of gazing of the user with respect to the object, determines whether or not the user is gazing at the object.

REFERENCE SIGNS LIST 1, 5 information processing system
10, 50 information processing device
20, 60 server
30, 70 network
101 viewpoint information obtaining unit
103 position-related information obtaining unit
105, 551 head rotation information obtaining unit
107, 553 gazing score calculating unit
109, 555 determining unit
111, 557 display control unit
113, 559 communication control unit
115, 561 memory unit
510 imaging device
550 display control device

The invention claimed is:

1. An information processing device comprising:
circuitry configured to
obtain viewpoint information related to a viewpoint of a user,
obtain position-related information related to position of the user and position of predetermined object,
obtain head rotation information related to angular velocity accompanying rotation of head region of the user and related to changes in the angular velocity, and
determine, based on a gazing score which is calculated for the object according to the position-related information, the head rotation information, and object information related to the object, and which indicates extent of gazing of the user with respect to the object, whether or not the user is gazing at the object,
wherein the object information related to the object on which the gazing score is based includes priority information related to the object, the priority information being based on a registered schedule of the user, and
wherein the registered schedule of the user is stored as a result of performing machine learning of behavior of the user.

2. The information processing device according to claim 1, wherein, when the gazing score for the object is equal to or greater than a predetermined threshold value, the circuitry determines that gazing state is attained in which the user is gazing at the object.

3. The information processing device according to claim 2, wherein the predetermined threshold value for the object is determined according to a relation between the object and the registered schedule of the user.

4. The information processing device according to claim 1, wherein the circuitry is further configured to calculate a gazing score based on the viewpoint information, the position-related information, and the head rotation information.

5. The information processing device according to claim 4, wherein the circuitry calculates the gazing score based on a gazing score calculated at previous calculation timing, and based on a gazing score addition amount corresponding to the viewpoint information, the position-related information, and the head rotation information.

6. The information processing device according to claim 5, wherein the circuitry calculates the gazing score according to distance between the viewpoint of the user and predetermined position of the object, the distance being calculated from the viewpoint information and the position-related information.

7. The information processing device according to claim 6, wherein the circuitry calculates the gazing score according to distance between the viewpoint of the user and a center of the object, the distance being calculated from the viewpoint information and the position-related information.

8. The information processing device according to claim 6, wherein the circuitry calculates the gazing score according to distance between the viewpoint of the user, which is on outside of the object, and edge of the object, the distance being calculated from the viewpoint information and the position-related information.

9. The information processing device according to claim 5, wherein the circuitry calculates the gazing score based on the object information related to the object which is set in advance.

10. The information processing device according to claim 5, wherein the circuitry calculates the gazing score based on user information which characterizes preferences of the user and which is set in advance.

11. The information processing device according to claim 5, wherein the circuitry calculates the gazing score based on gazing score history information related to history of the gazing score.

12. The information processing device according to claim 5, wherein
the position-related information contains distance information related to distance between the user and the object, and
the circuitry calculates the gazing score according to the distance information.

13. The information processing device according to claim 4, wherein
the position-related information contains relative velocity information related to relative velocity of the user with respect to the object, and
the circuitry calculates the gazing score according to the relative velocity information.

14. The information processing device according to claim 4, wherein the circuitry is further configured to control at least either a manner of displaying the object according to the gazing score of the object or display content of the object related to the object as provided according to the gazing score,
wherein information related to the object for which the gazing score is calculated by the circuitry is stored as object history information,
wherein the circuitry refers to the stored object history information and outputs object information containing an image of the object matching with predetermined condition.

15. The information processing device according to claim 1, wherein the circuitry is further configured to control at least either a manner of displaying the object according to the gazing score of the object or display content of the object related to the object as provided according to the gazing score.

16. The information processing device according to claim 15, wherein
when the gazing score for the object is equal to or greater than predetermined threshold value, the circuitry determines that gazing state is attained in which the user is gazing at the object, and
regarding the object under the gazing state, when the gazing score of the object is equal to or greater than predetermined threshold value, the circuitry displays at least a portion of the object information related to the object as provided according to the gazing score.

17. The information processing device according to claim 15, wherein, when the gazing score is equal to or greater than predetermined threshold value, the circuitry displays at least a portion of the object information, which is related to the object and which is provided according to the gazing score, in a superimposed manner within field of view of the user.

18. The information processing device according to claim 15, wherein the circuitry displays, in an enlarged manner, the object for which the gazing score is equal to or greater than threshold value.

19. The information processing device according to claim 15, wherein
a plurality of sets of information regarding each object of a plurality of objects is stored as the object information, and
the circuitry displays at least a portion of the object information according to a predetermined condition determined from among the object information.

20. An information processing method comprising:
obtaining viewpoint information related to a viewpoint of a user;
obtaining position-related information related to position of the user and position of predetermined object;
obtaining head rotation information related to angular velocity accompanying rotation of head region of the user and related to changes in the angular velocity; and
determining, based on a gazing score which is calculated for the object according to the position-related information, the head rotation information, and object information related to the object, and which indicates extent of gazing of the user with respect to the object, whether or not the user is gazing at the object,
wherein the object information related to the object on which the gazing score is based includes priority information related to the object, the priority information being based on a registered schedule of the user, and
wherein the registered schedule of the user is stored as a result of performing machine learning of behavior of the user.

21. A non-transitory computer-readable storage medium having embodied thereon a program, which when executed by a computer causes the computer to execute a method, the method comprising:
obtaining viewpoint information related to a viewpoint of a user;
obtaining position-related information related to position of the user and position of predetermined object;
obtaining head rotation information related to angular velocity accompanying rotation of head region of the user and related to changes in the angular velocity; and
determining, based on a gazing score which is calculated for the object according to the position-related information, the head rotation information, and object information related to the object, and which indicates extent of gazing of the user with respect to the object, whether or not the user is gazing at the object,
wherein the object information related to the object on which the gazing score is based includes priority information related to the object, the priority information being based on a registered schedule of the user, and
wherein the registered schedule of the user is stored as a result of performing machine learning of behavior of the user.

* * * * *